United States Patent
Peng et al.

(10) Patent No.: US 8,917,623 B2
(45) Date of Patent: Dec. 23, 2014

(54) POSITIONING METHOD, DEVICE AND SYSTEM

(71) Applicant: Huawei Technologies Co., Ltd., Shenzhen, Guangdong (CN)

(72) Inventors: Min Peng, Nanjing (CN); Yungui Wang, Nanjing (CN); Fuqing Sun, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 13/861,924

(22) Filed: Apr. 12, 2013

(65) Prior Publication Data

US 2013/0294265 A1 Nov. 7, 2013

(30) Foreign Application Priority Data

Apr. 13, 2012 (CN) .......................... 2012 1 0108981

(51) Int. Cl.
  *G01R 31/08* (2006.01)
  *H04W 24/10* (2009.01)
  *G01S 5/02* (2010.01)
  *H04W 36/00* (2009.01)

(52) U.S. Cl.
  CPC ............. *H04W 24/10* (2013.01); *G01S 5/0215* (2013.01); *G01S 5/0252* (2013.01); *G01S 5/0289* (2013.01)
  USPC .......................................... 370/252; 455/440

(58) Field of Classification Search
  None
  See application file for complete search history.

(56) References Cited

U.S. PATENT DOCUMENTS

| | | | |
|---|---|---|---|
| 2003/0043073 | A1 | 3/2003 | Gray et al. |
| 2006/0089153 | A1 | 4/2006 | Sheynblat |

FOREIGN PATENT DOCUMENTS

| | | | |
|---|---|---|---|
| EP | 1 030 531 | A1 | 8/2000 |
| JP | 2000244968 | A | 9/2000 |
| JP | 2001359146 | A | 12/2001 |
| JP | 2003057327 | A | 2/2003 |
| JP | 2003329757 | A | 11/2003 |
| JP | 2004364167 | A | 12/2004 |
| JP | 2005274363 | A | 10/2005 |
| JP | 2009047556 | A | 3/2009 |
| JP | 2009085780 | A | 4/2009 |
| JP | 2010056669 | A | 3/2010 |
| JP | 2010223593 | A | 10/2010 |
| JP | 2011099778 | A | 5/2011 |

*Primary Examiner* — Eunsook Choi

(57) ABSTRACT

The present invention provides a positioning method, device and system, which are applied to indoor WLAN positioning. A positioning server obtains location service information of APs in a set of APs to be measured; selects three APs to be measured in the set of APs to be measured according to a preset rule, and calculates a first coordinate of a terminal; if a calculated RSSI value of an unmeasured AP is not smaller than a difference between the measured RSSI value and a preset threshold, determines that signals of the unmeasured AP are not affected by reflection; and uses the first coordinate as a location coordinate of the terminal if all the three APs to be measured have been measured, thereby positioning the terminal.

20 Claims, 11 Drawing Sheets

POSITIONING METHOD, DEVICE AND SYSTEM

CROSS-REFERENCE TO RELATED APPLICATION

This application claims priority to Chinese Patent Application No. 201210108981.2, filed on Apr. 13, 2012, which is hereby incorporated by reference in its entirety.

TECHNICAL FIELD

The present invention relates to the communication field, and in particular, to a positioning method, device and system.

BACKGROUND

Positioning service includes navigation, assets tracing, medical care, and the like, and can capture location information of a mobile terminal quickly and accurately and enriches work and life of people. Method of positioning service generally includes global positioning system (Global Positioning System, GPS for short) positioning and wireless local area network (Wireless Local Area Network, WLAN for short) positioning. The GPS positioning depends on capture and reception of satellite signals. In an indoor environment, however, it is hard to receive signals of a positioning satellite, which leads to that the GPS positioning cannot be used normally. A WLAN is a computer local area network that uses wireless channels as transmission media. By means of a lightweight mobile device (such as a notebook computer, a palmtop computer, a personal digital assistant, and a positioning label), a WLAN positioning user may obtain high-quality access and requirement-compliant positioning services under flexible and efficient network coverage of the WLAN.

WLAN positioning methods mainly include a time of arrival (Time of Arrival, TOA for short) positioning method, a time difference of arrival (Time Difference of Arrival, TDOA for short) positioning method, and a received signal strength identifier (Received Signal Strength Identification, RSSI)-based positioning method. The RSSI positioning method mainly includes a fingerprint positioning method and a propagation model positioning method.

The basic principle of the TOA is as follows: When a terminal sends a signal, a timestamp t1 is added; when an access point (Access Point, AP for short) receives the signal, the access point records time t2 at which the signal is received. The difference between the two time values is the propagation duration of radio waves in the air. The speed of radio waves propagated in the air is the light velocity c. Therefore, the distance between the AP and the terminal is c*(t2−t1). With locations of at least three APs, the location of the terminal can be worked out according to trilateral positioning principle.

TDOA is an improved algorithm of TOA. TDOA still works by estimating the distance according to time. Unlike TOA, TDOA does not require the terminal to add a timestamp when the terminal sends a message; after at least three APs receive the message, the difference of distances from the terminal to the APs is obtained according to the time difference of receiving the signal. The difference between distances to two points is equal to a constant, which coincides with hyperbolic characteristic. With three APs, three hyperbolas are obtained, and the intersection of the three hyperbolas is the positioning location (or only two of the hyperbolas are considered).

The basic principle of the propagation model positioning method is as follows: researching a propagation model of a signal in the air, and estimating attenuation of the signal that has passed obstacles such as walls, thereby calculating strength of the signal in each location over a network.

However, the forgoing WLAN positioning methods are vulnerable to impact of reflection indoors, which affects positioning precision and leads to considerable errors in positioning results.

SUMMARY

Embodiments of the present invention provide a positioning method, device and system, which are applied to indoor WLAN positioning to improve precision of positioning a terminal by determining whether a signal between an access point and the terminal is affected by reflection.

To fulfill the foregoing objectives, the embodiments of the present invention adopt the following technical solutions:

In one aspect, an embodiment of the present invention provides a positioning method, including:

101. obtaining, by a positioning server, location service information of APs in a set of APs to be measured, where the set of APs to be measured includes at least three APs, and the location service information includes identifiers of AP, a measured received signal strength indicator RSSI value, and signal propagation time information;

102. selecting, by the positioning server, three APs to be measured in the set of APs to be measured according to a preset rule, and calculating a first coordinate of a terminal according to the signal propagation time information of the three APs to be measured;

103. obtaining, by the positioning server, a calculated RSSI value of any unmeasured AP in the three APs to be measured at the first coordinate according to a preset propagation model signal graph;

104. determining that signals of the unmeasured AP are not affected by reflection if the calculated RSSI value of the unmeasured AP is not smaller than a difference between a measured RSSI value of the unmeasured AP and a preset threshold, and determining, by the positioning server according to the identifiers of the APs, whether all the three APs to be measured have been measured;

105. performing 103 and 104 repeatedly if any one of the three APs to be measured has still not been measured;

106. using the first coordinate as a location coordinate of the terminal if all the three APs to be measured have been measured, thereby positioning the terminal.

In another aspect, an embodiment of the present invention provides a positioning method, including:

101. obtaining, by a positioning server, location service information of APs in a set of APs to be measured, where the set of APs to be measured includes at least three APs, and the location service information includes an identifier of an AP, a measured received signal strength indicator RSSI value, and a measured signal propagation duration value;

102. obtaining, by the positioning server, their respective calculated RSSI values of all APs in the set of APs to be measured at all coordinates in a preset propagation model signal graph according to the preset propagation model signal graph, calculating and comparing quadratic sums of differences between the calculated RSSI values of all APs in the set of APs to be measured at all coordinates and the three corresponding measured RSSI values of the APs, and using the coordinate corresponding to a minimum quadratic sum as a first coordinate of the terminal;

103. selecting, by the positioning server according to a preset rule, any unmeasured AP in the set of APs to be measured, and calculating a calculated signal propagation duration value of propagating a signal from the unmeasured AP to the first coordinate in the propagation model signal graph according to a distance from the unmeasured AP to the first coordinate in the preset propagation model signal graph;

104. determining that signals of the unmeasured AP are not affected by reflection if an absolute value of a difference between a calculated signal propagation duration value of the unmeasured AP and the measured signal propagation duration value of the unmeasured AP is not greater than a preset threshold, and determining, by the positioning server according to the identifiers of the APs, whether all APs in the set of APs to be measured have been measured;

105. performing 103 and 104 repeatedly if any AP in the set of APs to be measured has still not been measured; and 106. using the first coordinate as a location coordinate of the terminal if all APs in the set of APs to be measured have been measured, thereby positioning the terminal.

In one aspect, an embodiment of the present invention provides a positioning device, including:

a first obtaining unit, configured to obtain location service information of APs in a set of APs to be measured, where the set of APs to be measured includes at least three APs, and the location service information includes an identifier of an AP, a measured received signal strength indicator RSSI value, and signal propagation time information;

a calculating unit, configured to select three APs to be measured in the set of APs to be measured according to a preset rule, and calculate a first coordinate of a terminal according to the signal propagation time information of the three APs to be measured;

a second obtaining unit, configured to obtain a calculated RSSI value of any unmeasured AP in the three APs to be measured at the first coordinate according to a preset propagation model signal graph;

a first determining unit, configured to determine whether the calculated RSSI value of the unmeasured AP is smaller than a difference between a measured RSSI value of the unmeasured AP and a preset threshold, so as to determine whether signals of the unmeasured AP are not affected by reflection;

a second determining unit, configured to determine, according to the identifiers of the APs, whether all the three APs to be measured have been measured if the first determining unit determines that the calculated RSSI value of the unmeasured AP is not smaller than the difference between the measured RSSI value of the unmeasured AP and the preset threshold and that the signals of the unmeasured AP are not affected by reflection; and a positioning unit, configured to determine the first coordinate as a location coordinate of the terminal if the second determining unit determines that all the three APs to be measured have been measured, thereby realizing the positioning of the terminal.

In another aspect, an embodiment of the present invention provides a positioning device, including:

an obtaining unit, configured to obtain location service information of APs in a set of APs to be measured, where the set of APs to be measured includes at least three APs, and the location service information includes an identifier of an AP, a measured received signal strength indicator RSSI value, and a measured signal propagation duration value;

a calculating and comparing unit, configured to obtain their respective calculated RSSI values of all APs in the set of APs to be measured at all coordinates in a preset propagation model signal graph according to the preset propagation model signal graph, calculate and compare quadratic sums of differences between the calculated RSSI values of all APs in the set of APs to be measured at all coordinates and the three corresponding measured RSSI values of the APs, and use the coordinate corresponding to a minimum quadratic sum as a first coordinate of the terminal;

a calculating unit, configured to select, according to a preset rule, any unmeasured AP in the set of APs to be measured, and calculate a calculated signal propagation duration value of propagating a signal from the unmeasured AP to the first coordinate in the propagation model signal graph according to a distance from the unmeasured AP to the first coordinate in the preset propagation model signal graph;

a first determining unit, configured to determine whether an absolute value of a difference between the calculated signal propagation duration value of the unmeasured AP and the measured signal propagation duration value of the unmeasured AP is greater than a preset threshold, so as to determine whether signals of the unmeasured AP are not affected by reflection;

a second determining unit, configured to determine, according to the identifiers of the APs, whether all the APs in the set of APs to be measured have been measured if the first determining unit determines that the absolute value of the difference between the calculated signal propagation duration value of the unmeasured AP and the measured signal propagation duration value of the unmeasured AP is not greater than the preset threshold and that the signals of the unmeasured AP are not affected by reflection; and a positioning unit, configured to determine the first coordinate as a location coordinate of the terminal if the second determining unit determines that all the APs in the set of APs to be measured have been measured, thereby realizing the positioning of positioning the terminal.

In still another aspect, an embodiment of the present invention provides a positioning system, including at least three APs and the positioning server that is described above.

With the positioning method, device and system provided in the embodiments of the present invention and applied to indoor WLAN positioning, a comparison is made first for a same AP to be measured to check whether a difference between a measured RSSI value and a calculated RSSI value of the AP to be measured falls within a preset threshold according to location service information and a preset propagation model signal graph; or, a comparison is made to check whether a difference between a measured propagation duration value and a calculated propagation duration value of the AP to be measured falls within a preset threshold, a determination is made as to whether signal reflection between the AP to be measured and a terminal affects precision of positioning results, and then a location coordinate of the terminal are obtained by using the APs whose signal is not affected by reflection, thereby improving precision of positioning the terminal.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
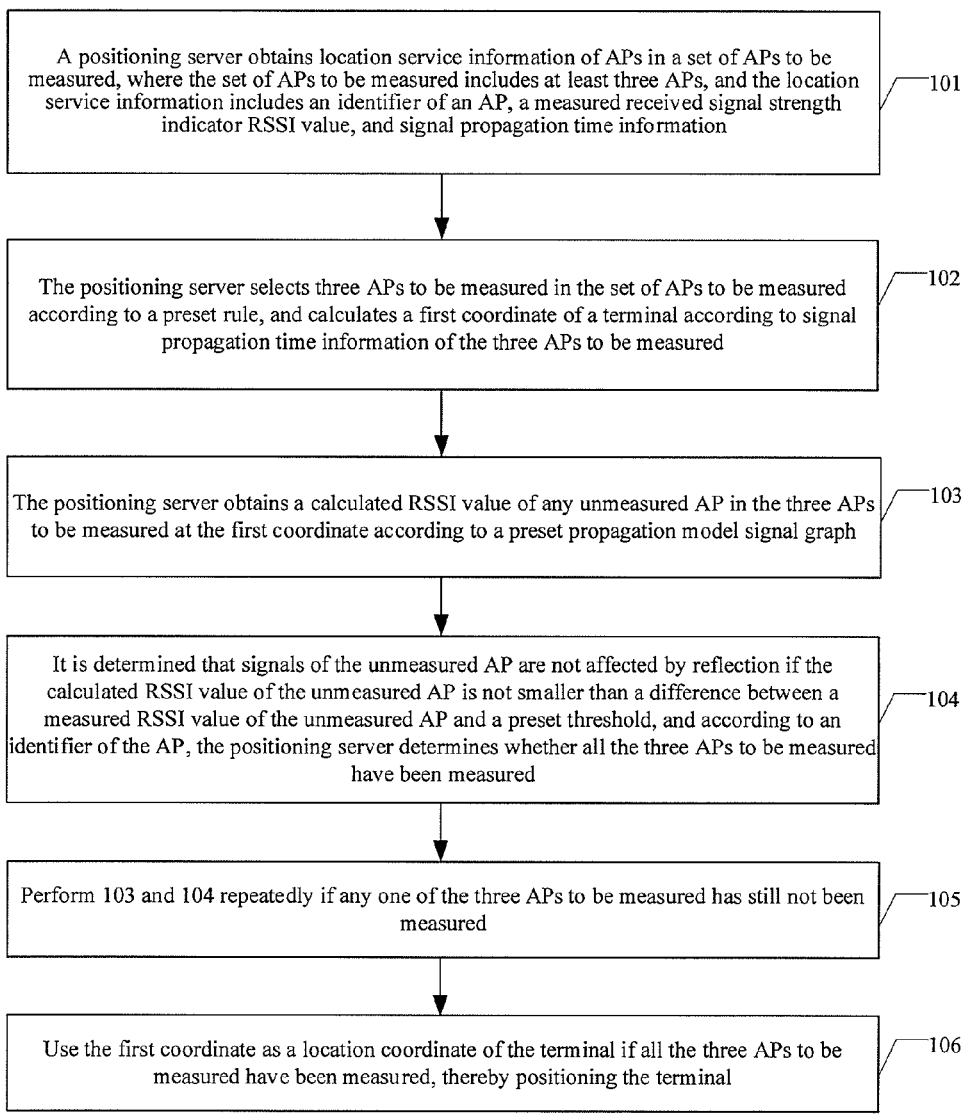
FIG. 1 is a flowchart of a positioning method according to an embodiment of the present invention.

In one aspect, an embodiment of the present invention provides a positioning method. Referring to FIG. 1, the method includes:

101. A positioning server obtains location service information of APs in a set of APs to be measured, where the set of APs to be measured includes at least three APs, and the location service information includes an identifier of an AP, a measured received signal strength indicator RSSI value, and signal propagation time information.

102. The positioning server selects three APs to be measured in the set of APs to be measured according to a preset rule, and calculates a first coordinate of a terminal according to signal propagation time information of the three APs to be measured.

103. The positioning server obtains a calculated RSSI value of any unmeasured AP in the three APs to be measured at the first coordinate according to a preset propagation model signal graph.

104. It is determined that signals of the unmeasured AP are not affected by reflection if the calculated RSSI value of the unmeasured AP is not smaller than a difference between a measured RSSI value of the unmeasured AP and a preset threshold, and according to the identifiers of the APs, the positioning server determines whether all the three APs to be measured have been measured.

105. Perform 103 and 104 repeatedly if any one of the three APs to be measured has still not been measured.

106. Use the first coordinate as a location coordinate of the terminal if all the three APs to be measured have been measured, thereby positioning the terminal.

With the positioning method provided in the embodiment of the present invention and applied to indoor WLAN positioning, a comparison is made for the same AP to be measured according to location service information and a preset propagation model signal graph, to check whether a difference between a measured RSSI value in the location service information of the AP to be measured and a calculated RSSI value obtained according to a preset propagation model signal graph falls within a preset threshold; a determination is made as to whether signal propagation between the AP to be measured and a terminal affects precision of positioning results, and then location coordinates of the terminal are obtained by using the APs whose signal is not affected by reflection, thereby improving precision of the terminal location.

Figure 2:
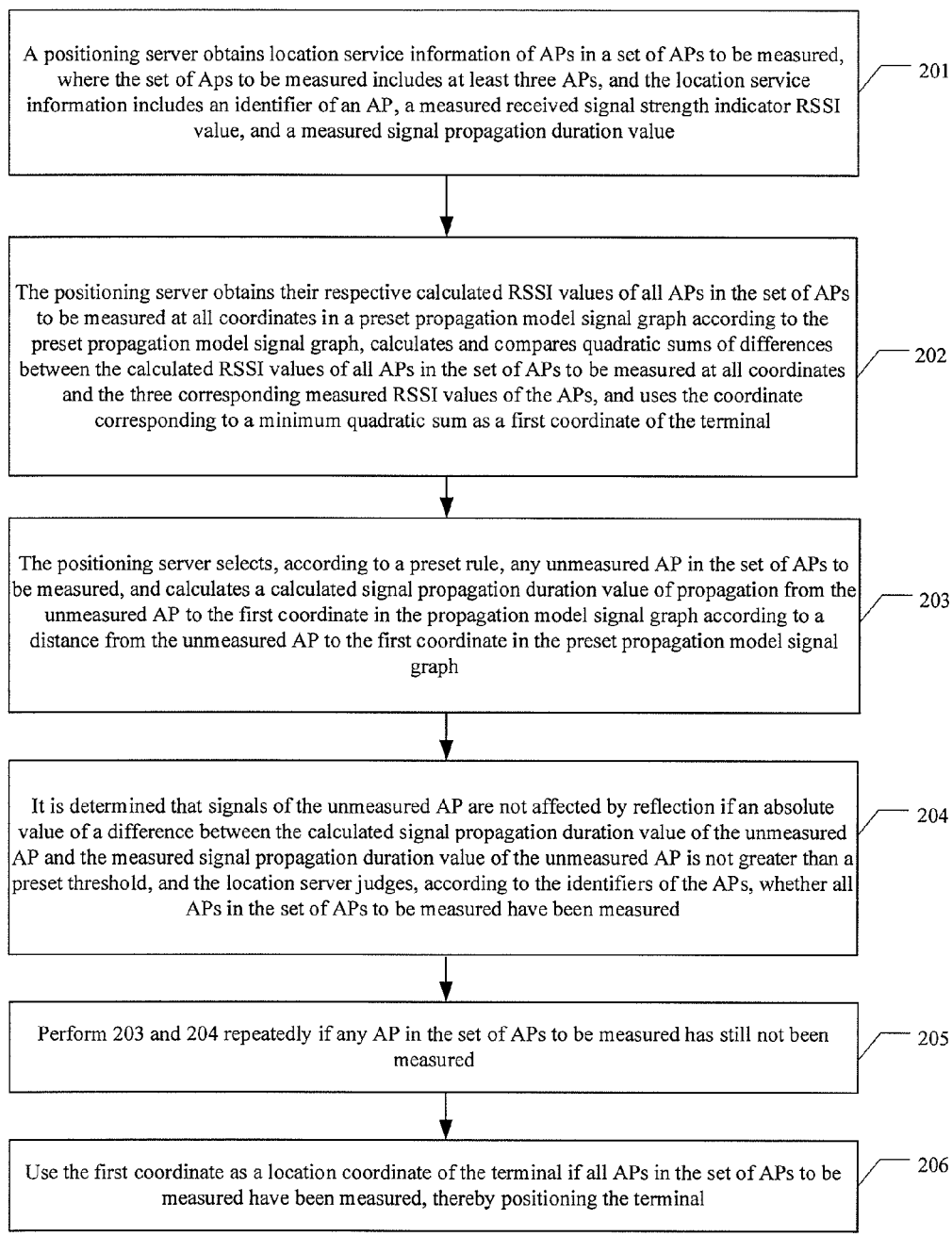
FIG. 2 is a flowchart of another positioning method according to an embodiment of the present invention.

An embodiment of the present invention provides another positioning method, which is applied to indoor WLAN positioning. Referring to FIG. 2, the method includes:

201. A positioning server obtains location service information of APs in a set of APs to be measured, where the set of APs to be measured includes at least three APs, and the location service information includes an identifier of an AP, a measured received signal strength indicator RSSI value, and a measured signal propagation duration value.

202. The positioning server obtains their respective calculated RSSI values of all APs in the set of APs to be measured at all coordinates in a preset propagation model signal graph according to the preset propagation model signal graph, calculates and compares quadratic sums of differences between the calculated RSSI values of all APs in the set of APs to be measured at all coordinates and the three corresponding measured RSSI values of the APs, and uses the coordinate corresponding to a minimum quadratic sum as a first coordinate of the terminal.

203. The positioning server selects, according to a preset rule, any unmeasured AP in the set of APs to be measured, and calculates a duration value of propagating a signal from the unmeasured AP to the first coordinate in the propagation model signal graph according to a distance from the unmeasured AP to the first coordinate in the preset propagation model signal graph.

204. It is determined that signals of the unmeasured AP are not affected by reflection if an absolute value of a difference between the calculated signal propagation duration value of the unmeasured AP and the measured signal propagation duration value of the unmeasured AP is not greater than a preset threshold, and according to the identifiers of the APs, the positioning server determines whether all APs in the set of APs to be measured have been measured.

205. Perform 203 and 204 repeatedly if any AP in the set of APs to be measured has still not been measured.

206. Use the first coordinate as a location coordinate of the terminal if all APs in the set of APs to be measured have been measured, thereby positioning the terminal.

With the positioning method provided in the embodiment of the present invention and applied to indoor WLAN positioning, a comparison is made first for the same AP to be measured to check whether a difference between a measured propagation duration value in the location service information of the AP to be measured and a calculated propagation duration value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of positioning the terminal.

Figure 3A:
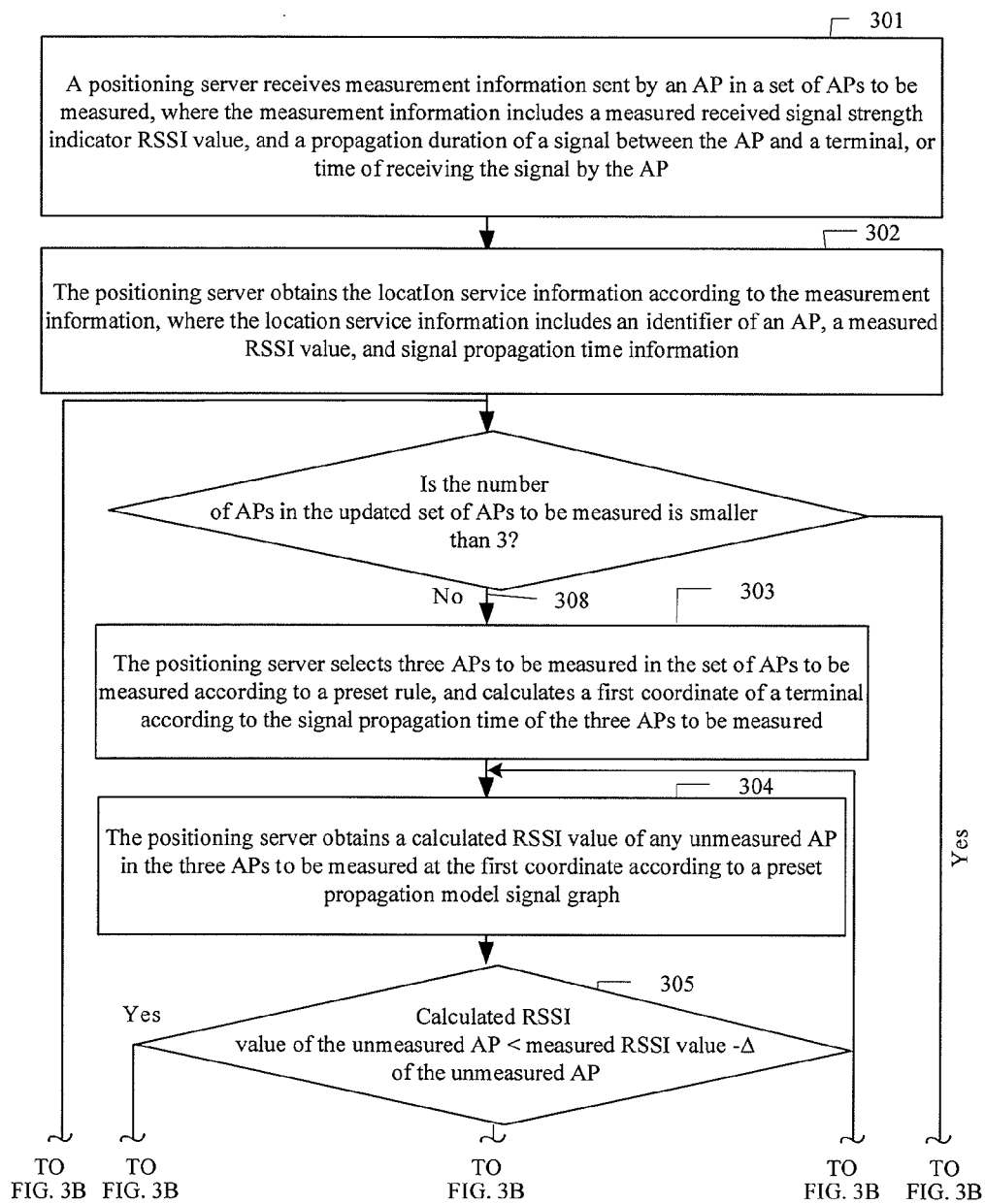
FIG. 3A and FIG. 3B are flowcharts of another positioning method according to an embodiment of the present invention.
Figure 3B:
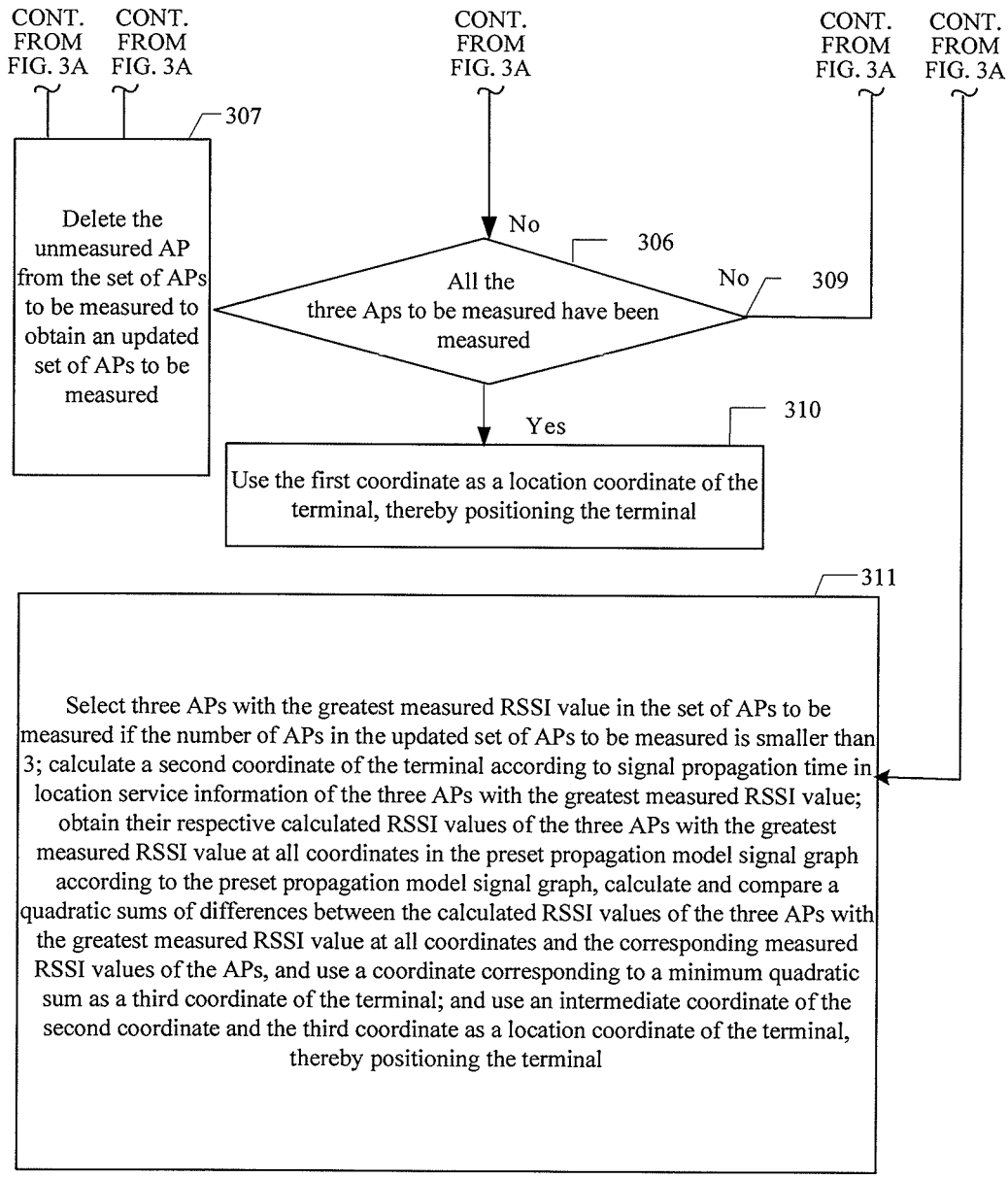

An embodiment of the present invention provides another positioning method, which is applied to indoor WLAN positioning. Referring to FIG. 3, the method includes:

301. A positioning server receives measurement information sent by an AP in a set of APs to be measured, where the measurement information includes a measured received signal strength indicator RSSI value, and a propagation duration of a signal between the AP and a terminal, or time of receiving the signal by the AP.

Exemplarily, the positioning server receives measurement information sent by at least three APs, and combines all the APs into a set of APs to be measured. Exemplarily, the set may be expressed as set B. Of course, it may also be expressed in a table form or another form. The positioning server may be deployed as an independent device, or deployed on one of the APs. The APs are connected with the positioning server through a wired network, and the terminal communicates with the APs through radio. The terminal may access one of the APs or not.

302. The positioning server obtains the location service information according to the measurement information, where the location service information includes an identifier of an AP, a measured RSSI value, and signal propagation time information.

Exemplarily, signals may be transmitted between the AP and the terminal in the form of packets. The signals may be sent by the terminal and received by the AP, or may be sent by the AP and received by the terminal.

The signal propagation time information includes a propagation duration of the signal between the AP and the terminal, or a duration difference of propagating the signal between the terminal and any two APs. Content of the signal propagation time information is not limited herein, and specifically depends on the selected mode of positioning. For example:

A. When a TOA mode is selected for positioning, the signal propagation time information is a propagation duration of the signal between the AP and the terminal. Exemplarily, an AP may send a packet, where the packet carries time of sending the packet by the AP; after receiving the packet, the terminal sends a feedback packet to the AP, where the feedback packet carries the time T1 of sending the packet by the AP, time T2 when the packet is received by the terminal, and time T3 of sending the feedback packet by the terminal; after receiving the feedback packet, the AP records identifier information of the terminal, the RSSI of the signal detected by the terminal, and time T4 of receiving the feedback packet. Optionally, the AP may calculate a propagation duration of the signal between the AP and the terminal according to $[(T4-T1)-(T3-T2)-T]/2$. Then the AP generates measurement information and sends the measurement information to the positioning server, so that the positioning server obtains the location service information of the AP according to the measurement information. It should be noted that, the propagation duration of the signal between the AP and the terminal may be carried in the measurement information and sent to the positioning server; or the recorded T1, T2, T3, and T4 may be carried in the measurement information and sent to the positioning server, and the positioning server calculates the propagation duration of the signal between the AP and the terminal. Where T1 is time of sending the signal by the AP, T2 is time of receiving the signal by the terminal from the AP, T3 is time of sending the feedback signal from the terminal to the AP, T4 is time of receiving the feedback signal by the AP from the terminal, and T is a reception and sending processing delay. The reception and sending processing delay T may be obtained empirically, or by measurement when the network is deployed. For example, a feasible measurement method is: Let the AP be close to the AP, and send a test message at time T5; after receiving the message at time T6, the AP sends a feedback message at time T7 immediately; when receiving the feedback message at time T8, the terminal can calculate the reception and sending processing delay $T=[(T8-T5)-(T7-T6)]/2$. This embodiment does not limit the manner of obtaining the reception and sending processing delay T.

B. When a TDOA mode is selected for positioning, the signal propagation time information is a duration difference of propagating the signal between the terminal and any two APs. The duration difference of propagating the signal between the terminal and the two APs is obtained according to signal receiving time differences in the measurement information of the two APs. Exemplarily, the terminal sends a packet to all APs simultaneously. The packet carries a terminal identifier such as a MAC address of a network adapter or a physical address of an RFID tag. After receiving the signal, the AP records the identifier information of the terminal, the RSSI of the signal detected by the terminal, and time of receiving the signal, generates measurement information and sends the measurement information to the positioning server. According to the signal receiving time differences in the measurement information measured and reported by the two APs, the positioning server obtains a duration difference of propagating the signal between the terminal and the two APs.

303. The positioning server selects three APs to be measured in the set of APs to be measured according to a preset rule, and calculates a first coordinate of a terminal according to the signal propagation time information of the three APs to be measured.

Preferably, the signal propagation time information is a propagation duration of the signal between the AP and, the terminal, and the preset rule is to sort the propagation durations of the signal between the AP and the terminal in ascending order; or, the signal propagation time information is a duration difference of propagating the signal between the terminal and any two APs, and the preset rule is to sort the time of receiving the signal by the AP in ascending order. In this way, the AP to be measured that is closest to the terminal may be selected as possible, which minimizes the probability of reflection impact and reduces calculation workload.

Initially, the number of elements in the set of APs to be measured, that is, set B, is greater than or equal to 3. According to the preset rule, three APs to be measured may be selected in B in this case. For example, a first AP, a second AP, and a third AP are selected. A first coordinate of the terminal is calculated according to the location service information of the three APs to be measured.

According to the signal propagation time information in the location service information, the positioning server selects the TOA method or the TDOA method to calculate the first coordinate of the terminal. However, the method for calculating the first coordinate of the terminal in the present invention is not limited to the TOA or TDOA. Any calculation methods that make use of the propagation time are appropriate if they can fulfill the objectives of the present invention.

Exemplarily, the first coordinates of the terminal are expressed as $(X, Y)$. The following gives further description, taking the TDOA method and the TOA method as an example respectively.

1. A TDOA method is used to calculate the first coordinate of the terminal, including: obtaining a time difference T1 of the signal arriving at a first AP and a third AP according to time of receiving the signal by the first AP and time of receiving the signal by the third AP; and obtaining a first calculated trace of the terminal according to the T1, coordinates $(x1, y1)$ of the first AP, and coordinates $(x3, y3)$ of the third AP, that is, $|\sqrt{(X-x1)^2+(Y-y1)^2}-\sqrt{(X-x3)^2+(Y-y3)^2}|=c*T1$, where c is the light velocity;

obtaining a time difference T2 of the signal arriving at the first AP and a second AP according to the time of receiving the signal by the first AP and time of receiving the signal by the second AP; and obtaining a second calculated trace of the terminal according to the T2, the coordinates (x1, y1) of the first AP, and coordinates (x2, y2) of the second AP, that is, $|\sqrt{(X-x1)^2+(Y-y1)^2}-\sqrt{(X-x2)^2+(Y-y2)^2}|=c*T2$, where c is the light velocity; and obtaining the first coordinate of the terminal according to an intersection of the first calculated trace and the second calculated trace, that is, a common solution of the foregoing two functions is the first coordinate of the terminal.

It should be noted that the method of calculating the first coordinate of the terminal is not limited to calculating the first coordinate according to the time difference T1 of the signal arriving at the first AP and the third AP as well as the time difference T2 of the signal arriving at the first AP and the second AP. For example, the first coordinate of the terminal may also be calculated according to the time difference T1 of the signal arriving at the first AP and the third AP as well as the time difference T3 of the signal arriving at the second AP and the third AP. Any two time differences in the three time differences of the signal arriving at the three APs are all right.

2. A TOA method is used to calculate the first coordinate of the terminal, including: obtaining a third calculated trace of the terminal $\sqrt{(X-x1)^2+(Y-y1)^2}=c*t1$, where c is the light velocity, according to the propagation duration t1 of the signal between the first AP and the terminal as well as the coordinates (x1, y1) of the first AP;

obtaining a fourth calculated trace of the terminal $\sqrt{(X-x2)^2+(Y-y2)^2}=c*t2$, where c is the light velocity, according to the propagation duration t2 of the signal between the second AP and the terminal as well as the coordinates (x2, y2) of the second AP;

obtaining a fifth calculated trace of the terminal $\sqrt{(X-x3)^2+(Y-y3)^2}=c*t3$, where c is the light velocity, according to the propagation duration t3 of the signal between the third AP and the terminal as well as the coordinates (x3, y3) of the third AP; and obtaining the first coordinates (X, Y) of the terminal according to an intersection of the third calculated trace, the fourth calculated trace, and the fifth calculated trace. That is, the first coordinates (X, Y) of the terminal is obtained by calculating a common solution of the foregoing three functions.

It should be noted that, in practice, signal reflection may occur and affect the positioning result of the above method. Therefore, the obtained first coordinate of the terminal may be not the actual location of the terminal.

304. The positioning server obtains a calculated RSSI value of any unmeasured AP in the three APs to be measured at the first coordinate according to a preset propagation model signal graph.

Exemplarily, it is assumed that the selected unmeasured AP is the first AP.

Exemplarily, the step of setting the propagation model signal graph may include:

setting a grid in which the side length of a grid cell meets a required positioning precision, where exemplarily, if the required positioning precision is 5 meters, the side length of the grid cell may be smaller than or equal to 5 meters;

importing a storey structure diagram that has the same scale as the grid into the grid, where the storey structure diagram includes obstacle information, and exemplarily, the obstacle information includes whereabouts of obstacles and types of obstacles, and the attenuation value of the obstacles is an empirical value, and can be read from a database on the positioning server or obtained by other means;

marking the location of each AP in the network; and calculating the RSSI value of each AP that is received by each grid cell in the grid.

It should be noted that calculating the RSSI value of each AP that is received by each grid cell is covered in the prior art, and is not limited herein. For example, the calculation may be performed by using the following formula:

$$P(d) = P(d_0) - 10n\log\left(\frac{d}{d_0}\right) - \begin{cases} nW * WAF & nW < C \\ C * WAF & nW \geq C \end{cases}$$

Where d is a distance from a current location to an access point, P(d) is an RSSI value of receiving in the current location, $P(d_0)$ is an RSSI value of receiving in a location at a distance of $d_0$ from the AP, n is an attenuation factor of the signal propagated in the air, WAF is attenuation of the signal penetrating an obstacle, nW is the number of obstacles penetrated in the propagation process, and C is an upper limit of the number of obstacles.

It should be noted that, the calculated RSSI value of each AP that is received by each grid cell may be calculated and stored first, and then the calculated RSSI value of the first AP that is received at the first coordinate may be queried according to the first coordinate of the terminal; or the calculation may be performed instantly, which may be set according to a computing power and a storage capacity of the positioning server.

However, to implement more precise positioning, when any change occurs in the calculation method based on the propagation model, or occurs in the formula or a parameter of the formula, update and storage can be performed in time.

305. Judge whether the calculated RSSI value of the unmeasured AP is smaller than a difference between a measured RSSI value of the unmeasured AP and a preset threshold.

Exemplarily, a strength difference threshold A may be preset in the positioning server. When the calculated signal strength RSSI value of the first AP is not smaller than a difference between the measured signal strength value of the first AP and £, it may be deemed that the signal reflection between the first AP and the terminal does not affect the positioning result, where the value of L may be selected according to a required positioning precision.

306. It is determined that signals of the unmeasured AP are not affected by reflection if the calculated RSSI value of the unmeasured AP is not smaller than a difference between a measured RSSI value of the unmeasured AP and a preset threshold, and according to the identifiers of the APs, the positioning server determines whether all the three APs to be measured have been measured.

For example, it indicates that the signals between the first AP and the terminal are not affected by reflection or the reflection does not affect the positioning precision if the calculated RSSI value of the first AP is not smaller than the difference between the measured RSSI value of the first AP and the preset threshold A, and according to the identifier of the AP, the positioning server determines whether the first AP, the second AP, and the third AP have all been measured.

307. It is determined that the signals of the unmeasured AP are affected by reflection if the calculated RSSI value of the unmeasured AP is smaller than the difference between the measured RSSI value of the unmeasured AP and the preset threshold, and the positioning server deletes the unmeasured AP from the set of APs to be measured to obtain an updated set of APs to be measured.

Exemplarily, it indicates that the signals between the first AP and the terminal are reflected and the reflection affects the positioning precision if the calculated RSSI value of the first AP is smaller than the difference between the measured RSSI value of the first AP and the preset threshold £, and therefore, the first AP is deleted from the set of APs to be measured to obtain an updated set of APs to be measured. That is, the first AP is deleted from the set B to obtain an updated set B.

308. Perform 303 to 307 repeatedly if the number of APs in the updated set of APs to be measured is greater than or equal to 3.

Exemplarily, when the number of APs in the updated set of APs to be measured is greater than or equal to 3, the positioning server selects, according to the preset rule, three APs to be measured in the updated set B, and recalculates the first coordinate of the terminal, selects any unmeasured AP in the three APs to be measured, and determines whether the signals of the unmeasured AP are affected by reflection. If the signals are affected by reflection, the positioning server deletes the AP and updates the set B again; if the signals are not affected by reflection, the positioning server goes on determining whether the signals of other APs in the three APs to be measured are affected by reflection.

309. Perform 304 and 305 repeatedly if any one of the three APs to be measured has still not been measured.

Exemplarily, if it is determined that the signal reflection between the first AP and the terminal does not affect the positioning result, the positioning server determines, according to the identifier of the AP, whether the first AP, the second AP, and the third AP have all been measured. For example, if the second AP and the third AP are unmeasured, 304 and 305 are repeated. It is assumed that the second AP is selected when 304 is repeated. After it is determined in 304 and 305 that the signal reflection between the second AP and the terminal does not affect the positioning result, the positioning server determines, according to the identifier of the AP, whether the first AP, the second AP, and the third AP have all been measured. For example, if the third AP is still not measured, the positioning server performs 304 and 305 repeatedly to determine whether the signal reflection between the third AP and the terminal affects the positioning result.

310. Use the first coordinate as a location coordinate of the terminal if all the three APs to be measured have been measured, thereby positioning the terminal.

Exemplarily, if the first AP, the second AP, and the third AP have all been measured, it indicates that no signal reflection between the first AP and the terminal, or between the second AP and the terminal, or between the third AP and the terminal affects the positioning result. Therefore, the first coordinate obtained by using the first AP, the second AP, and the third AP is a location coordinate of the terminal, thereby positioning the terminal.

311. Select three APs with the greatest measured RSSI value in the set of APs to be measured when the number of APs in the updated set of APs to be measured is smaller than 3.

Calculate a second coordinate of the terminal according to signal propagation time information in location service information of the three APs with the greatest measured RSSI value.

Obtain their respective calculated RSSI values of the three APs with the greatest measured RSSI value at all coordinates in the preset propagation model signal graph according to the preset propagation model signal graph, calculate and compare quadratic sums of differences between the calculated RSSI values of the three APs with the greatest measured RSSI value at all coordinates and the three corresponding measured RSSI values of the APs, and use a coordinate corresponding to a minimum quadratic sum as a third coordinate of the terminal;

Exemplarily, it is assumed that the measured RSSI values of the three APs with the greatest measured RSSI value are A1, A2, and A3.

Obtain their respective calculated RSSI values of the three APs with the greatest measured RSSI value at all coordinates in the preset propagation model signal graph according to the preset propagation model signal graph. For example, the calculated RSSI values of the three APs with the greatest measured RSSI value at coordinate A in the preset propagation model signal graph are a1, a2, and a3 respectively, and the calculated RSSI values at coordinate B are b1, b2, and b3 respectively. In this way, the calculated RSSI values at all coordinates are obtained.

Calculate and compare the quadratic sums of differences between the calculated RSSI values of the three APs at all coordinates and the three corresponding measured RSSI values of the APs. For example, at coordinate A, the quadratic sum of the differences between the measured values of the three APs and the calculated values is $(A1-a1)^2+(A2-a2)^2+(A3-a3)^2$; at coordinate B, the quadratic sum of the differences between the measured values of the three APs and the calculated values is $(A1-b1)^2+(A2-b2)^2+(A3-b3)^2$. In this way, the quadratic sums of differences between the calculated RSSI values of the three APs at all coordinates and the three corresponding measured RSSI values of the APs are obtained. The quadratic sums of differences between the calculated RSSI values of the three APs at all coordinates and the three corresponding measured RSSI values of the APs are compared, and the coordinate corresponding to the minimum quadratic sum is a third coordinate of the terminal.

Use an intermediate coordinate of the second coordinate and the third coordinate as a location coordinate of the terminal, thereby positioning the terminal.

With the positioning method provided in the embodiment of the present invention and applied to indoor WLAN positioning, a comparison is made for the same AP to be measured to check whether a difference between a measured RSSI value in the location service information of the AP to be measured and a calculated RSSI value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

Figure 4A:
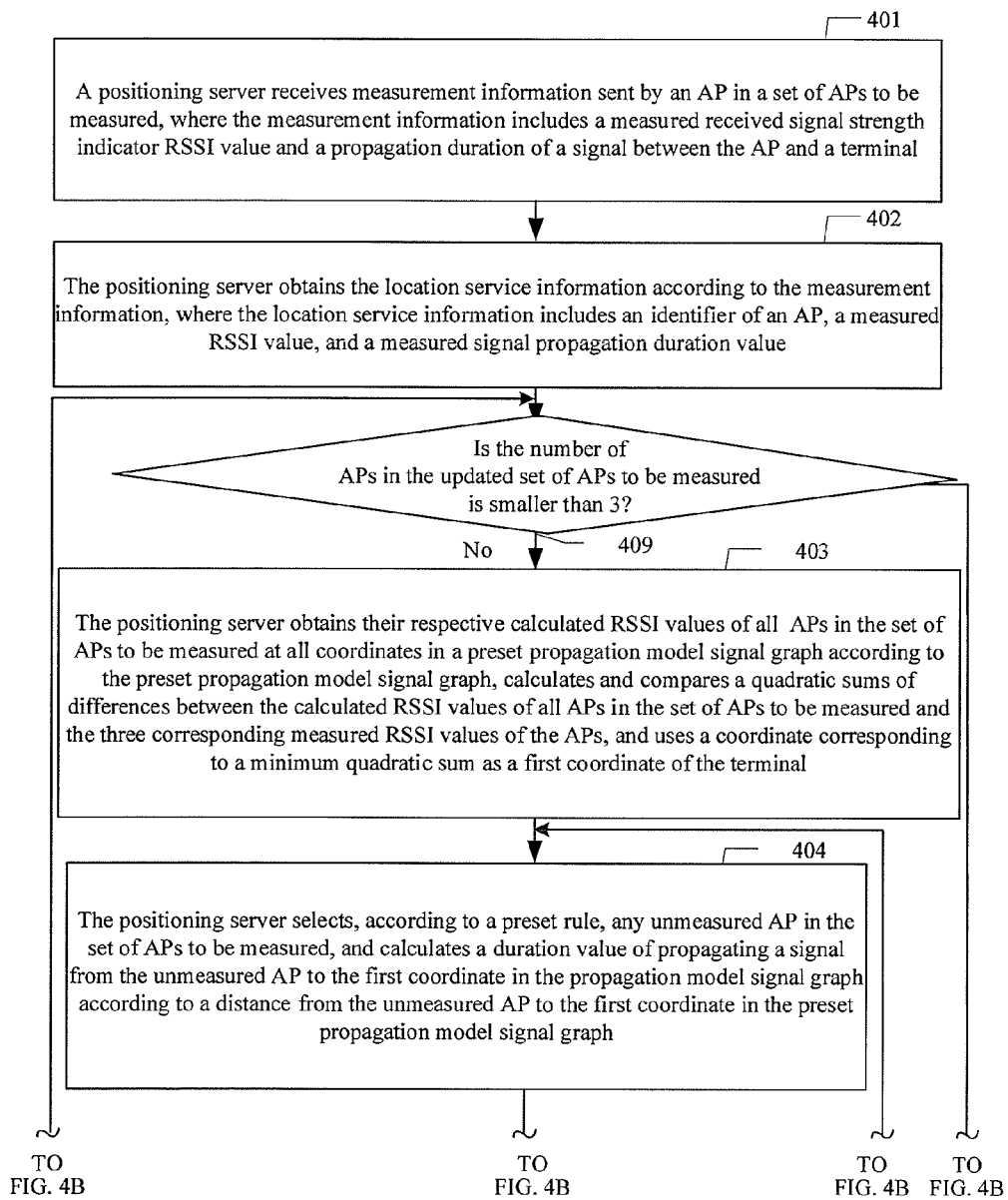
FIG. 4A and FIG. 4B are flowcharts of another positioning method according to an embodiment of the present invention.
Figure 4B:
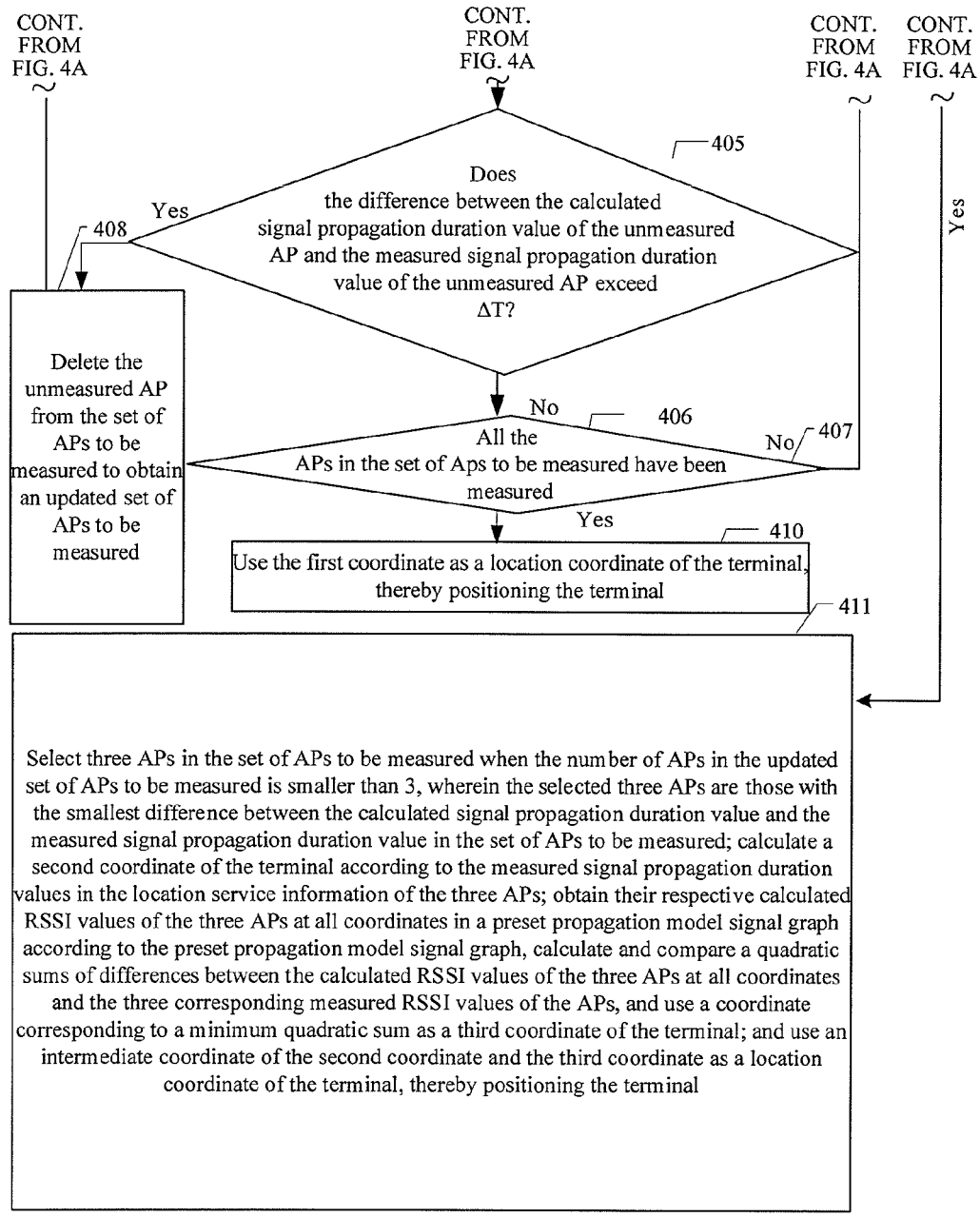

An embodiment of the present invention provides another positioning method, which is applied to indoor WLAN positioning. Referring to FIG. 4, the method includes:

401. A positioning server receives measurement information sent by an AP in a set of APs to be measured, where the measurement information includes a measured received signal strength indicator RSSI value and a propagation duration of a signal between the AP and a terminal.

The set of APs to be measured includes at least three APs.

Exemplarily, the positioning server receives measurement information sent by at least three APs, and combines all the APs into a set of APs to be measured. Exemplarily, the set may be expressed as set B. Nevertheless, it may be expressed in a table form or another form. The positioning server may be deployed as an independent device, or deployed on one of the APs. The AP is connected with the server through a wired network, and the terminal communicates with the AP through radio. The terminal may access one of the APs or not.

402. The positioning server obtains the location service information according to the measurement information. The location service information includes an identifier of an AP, a measured RSSI value, and a measured signal propagation duration value.

Exemplarily, the process of the positioning server obtaining the location service information according to the measurement information sent by the AP is the same as A in 302 in the foregoing embodiment, and is not repeated herein any further.

403. The positioning server obtains their respective calculated RSSI values of all APs in the set of APs to be measured at all coordinates in a preset propagation model signal graph according to the preset propagation model signal graph, calculates and compares quadratic sums of differences between the calculated RSSI values of all APs in the set of APs to be measured at all coordinates and the three corresponding measured RSSI values of the APs, and uses the coordinate corresponding to a minimum quadratic sum as a first coordinate of the terminal.

Exemplarily, after receiving information about the same terminal from all APs to be measured, the positioning server may use B to express the set of all APs to be measured, and set an empty set A.

Initially, the number of elements in the set B is greater than or equal to 3.

The manner of setting the propagation model signal graph is the same as the foregoing embodiment, and is not repeated herein any further. Also, the RSSI value of each AP that is received by each grid cell may be calculated and stored first; or the calculation may be performed instantly, which may be set according to a computing power and a storage capacity of the positioning server. However, to implement more precise positioning, when any change occurs in the calculation method based on the propagation model, or occurs in the formula or a parameter of the formula, update and storage can be performed in time.

Exemplarily, it is assumed that the set of APs to be measured includes n APs. Therefore, the measured RSSI values of the n APs are $A1, A2, A3, \ldots, An$.

Obtain their respective calculated RSSI values of the n APs at all coordinates in a preset propagation model signal graph according to the preset propagation model signal graph. For example, the calculated RSSI values of the n APs at coordinate A in the preset propagation model signal graph are $a1, a2, a3, \ldots, An$, respectively, and the calculated RSSI values at coordinate B are $b1, b2, b3, \ldots, Bn$, respectively. In this way, the calculated RSSI values of the n APs at all coordinates are obtained.

Calculate and compare the quadratic sums of differences between the calculated RSSI values of the n APs at all coordinates and the corresponding measured RSSI values of the APs. For example, at coordinate A, the quadratic sum of the differences between the measured values of the n APs and the calculated values is $(A1-a1)^2+(A2-a2)^2+(A3-a3)^2+ \ldots +(An-an)^2$; at coordinate B, the quadratic sum of the differences between the measured values of the n APs and the calculated values is $(A1-b1)^2+(A2-b2)^2+(A3-b3)^2+ \ldots +(An-bn)^2$. In this way, the quadratic sums of differences between the calculated RSSI values of the n APs at all coordinates and the corresponding measured RSSI values of the APs are obtained. The quadratic sums of differences between the calculated RSSI values of the n APs at all coordinates and the corresponding measured RSSI values of the APs are compared, and the coordinate corresponding to the minimum quadratic sum is a first coordinate of the terminal.

Preferably, to reduce the calculation workload, it is appropriate to determine the coordinate of the AP with the greatest measured RSSI value in the set of APs to be measured in the preset propagation model signal graph first, and then calculate a quadratic sum of differences between the calculated RSSI values of the n APs, which are located at coordinates corresponding to a cell of this coordinate and cells around this cell, and the corresponding measured RSSI values of the APs, and use the coordinate corresponding to a minimum quadratic sum as a first coordinate of the terminal.

In practice, signal reflection may occur and affect the positioning result of the propagation model. Therefore, the obtained first coordinate of the terminal may be not the actual location of the terminal.

404. The positioning server selects, according to a preset rule, any unmeasured AP in the set of APs to be measured, and calculates a duration value of propagating a signal from the unmeasured AP to the first coordinate in the propagation model signal graph according to a distance from the unmeasured AP to the first coordinate in the preset propagation model signal graph.

Exemplarily, the preset rule may be assigning a serial number to each AP in the set of APs to be measured, and then selecting the AP consecutively. Nevertheless, such is only an example of the preset rule.

For example, the positioning server selects the first AP, and may use the coordinate of the first AP and the first coordinate of the terminal in the propagation model signal graph to obtain a distance from the first AP to the first coordinate, and by dividing the light velocity by the distance, obtain a calculated duration value of propagation from the first AP to the first coordinate in the propagation model signal graph.

405. Judge whether an absolute value of the difference between the calculated signal propagation duration value of the unmeasured AP and the measured signal propagation duration value of the unmeasured AP exceeds a preset threshold.

Exemplarily, the positioning server may preset a time difference threshold $\Delta T$. If the absolute value of the difference between the calculated propagation duration value and the measured propagation duration value is not greater than the set time difference threshold $\Delta T$, it may be deemed that the reflection affects the positioning result, where the value of $\Delta T$ may be selected according to the required positioning precision.

406. It is determined that signals of the unmeasured AP are not affected by reflection if the absolute value of the difference between the calculated signal propagation duration value of the unmeasured AP and the measured signal propagation duration value of the unmeasured AP is not greater than the preset threshold, and according to the identifiers of the APs, the positioning server determines whether all APs in the set of APs to be measured have been measured.

For example, it indicates that signals of the first AP are not affected by reflection if the absolute value of the difference between the calculated signal propagation duration value of the first AP and the measured signal propagation duration value of the first AP is not greater than $\Delta T$, and according to the identifiers of the APs, the positioning server determines whether all APs in the set of APs to be measured have been measured.

407. Perform 404 to 406 repeatedly if any AP in the set of APs to be measured has still not been measured.

Exemplarily, if the positioning server determines that the signals of the first AP are not affected by reflection, the positioning server determines, according to the identifier of the AP, whether all the APs in the set of APs to be measured have been measured. If any AP is still not measured, the positioning server selects any AP in the unmeasured APs according to the preset rule, and then determines whether the signals of the AP are affected by reflection, and so on.

408. It is determined that the signals of the unmeasured AP are affected by reflection if the absolute value of the difference between the calculated signal propagation duration value of the unmeasured AP and the measured signal propagation duration value of the unmeasured AP is greater than the preset threshold, and the positioning server deletes the unmeasured AP from the set of APs to be measured to obtain an updated set of APs to be measured.

Exemplarily, it is deemed that the signals of the first AP are affected by reflection if the absolute value of the difference between the calculated signal propagation duration value of the first AP and the measured signal propagation duration value of the first AP is greater than $\Delta T$, and the positioning server deletes the first AP from the set of APs to be measured to obtain an updated set of APs to be measured, that is, obtain an updated set B.

409. Perform 403 to 408 repeatedly if the number of APs in the updated set of APs to be measured is greater than or equal to 3.

Exemplarily, if the number of APs in the updated set of APs to be measured is greater than or equal to 3 after the positioning server deletes the measured AP whose signals are affected by reflection, the positioning server obtains a new first coordinate of the terminal by using the positioning service information of all APs in the updated set of APs to be measured and the preset propagation model signal graph, and then selects, according to the preset rule, any unmeasured AP in the updated set of APs to be measured, and determines whether the unmeasured AP is affected by reflection. If the AP is affected by reflection, the positioning server deletes the AP and again obtains an updated set of APs to be measured; if the AP is not affected by reflection, the positioning server determines whether other APs are affected by reflection, and so on.

410. Use the first coordinate as a location coordinate of the terminal if all APs in the set of APs to be measured have been measured, thereby positioning the terminal.

Exemplarily, if all APs in the set of APs to be measured have been measured, it indicates that the signal between no AP in the set of APs to be measured and the terminal is affected by reflection. Therefore, the first coordinate of the terminal that is obtained by using the AP in the set of APs to be measured is a location coordinate of the terminal, thereby positioning the terminal.

411. Select three APs in the set of APs to be measured when the number of APs in the updated set of APs to be measured is smaller than 3, where the selected three APs are those with the smallest difference between the calculated signal propagation duration value and the measured signal propagation duration value in the set of APs to be measured.

A second coordinate of the terminal is calculated according to the measured signal propagation duration value in the location service information of the three APs.

Their respective calculated RSSI values of the three APs at all coordinates in a preset propagation model signal graph are obtained according to the preset propagation model signal graph, quadratic sums of differences between the calculated RSSI values of the three APs at all coordinates and the three corresponding measured RSSI values of the APs are calculated and compared, and a coordinate corresponding to a minimum quadratic sum is used as a third coordinate of the terminal.

An intermediate coordinate of the second coordinate and the third coordinate is used as a location coordinate of the terminal, thereby positioning the terminal.

With the positioning method provided in the embodiment of the present invention and applied to indoor WLAN positioning, a comparison is made first for the same AP to be measured to check whether a difference between a measured propagation duration value in the location service information of the AP to be measured and a calculated propagation duration value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

Figure 5:
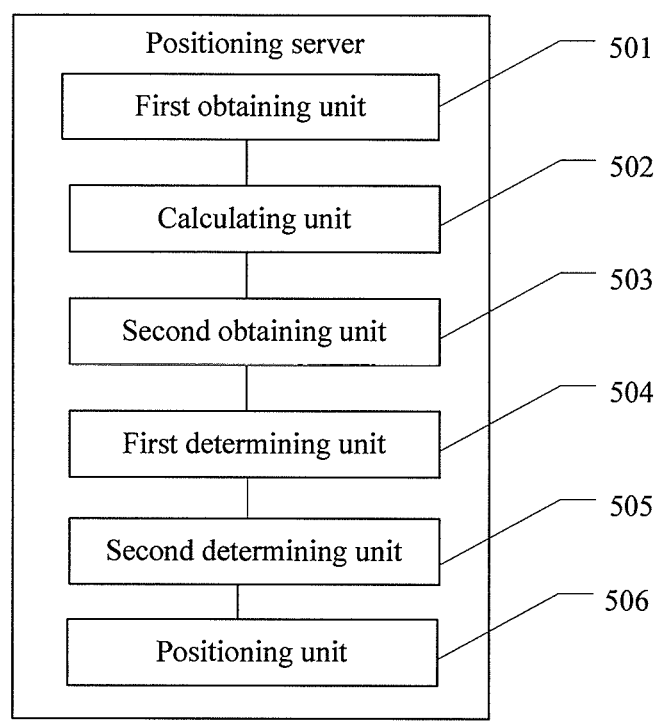
FIG. 5 is a structural diagram of a positioning device according to an embodiment of the present invention.

In another aspect, an embodiment of the present invention provides a positioning device to implement the method shown in FIG. 1. Referring to FIG. 5, the positioning device includes a first obtaining unit 501, a calculating unit 502, a second obtaining unit 503, a first determining unit 504, a second determining unit 505, and a positioning unit 506. Here, The first obtaining unit 501 is configured to obtain location service information of APs in a set of APs to be measured, where the set of APs to be measured includes at least three APs, and the location service information includes an identifier of an AP, a measured received signal strength indicator RSSI value, and signal propagation time information.

Exemplarily, the device may be deployed on the positioning server, and the positioning server receives measurement information sent by at least three APs, and according to the measurement information, obtains location service information sent by the at least three APs for the purpose of positioning the terminal. The positioning server may be deployed as an independent device, or deployed on one of the APs. The AP is connected with the server through a wired network, and the terminal communicates with the AP through radio. The terminal may access one of the APs or not.

Exemplarily, signals may be transmitted between the AP and the terminal in the form of packets. The signals may be sent by the terminal and received by the AP, or may be sent by the AP and received by the terminal.

The signal propagation time information includes a propagation duration of the signal between the AP and the terminal, or a duration difference of propagating the signal between the terminal and any two APs. Content of the signal propagation time information is not limited herein, and specifically depends on the selected mode of positioning.

For example, when a TOA mode is selected for positioning, the signal propagation time information is a propagation duration of the signal between the AP and the terminal. Exemplarily, an AP may send a packet, where the packet carries time of sending the packet; after receiving the packet, the terminal sends a feedback packet to the AP, where the feedback packet carries the time T1 of sending the packet by the AP, time T2 of receiving the packet by the terminal, and time T3 of sending the feedback packet by the terminal; after receiving the feedback packet, the AP records identifier information of the terminal, the RSSI of the signal detected by the terminal, and time T4 of receiving the feedback packet.

Optionally, the AP may calculate a propagation duration t of the signal between the AP and the terminal according to [(T4−T1)−(T3−T2)−T]/2. Afterward, the AP generates measurement information and sends it to the positioning server, whereupon the positioning server obtains the location service information of the AP according to the measurement information. It should be noted that, the AP may add the propagation duration of the signal between the AP and the terminal into the measurement information and send the measurement information to the positioning server; or add the recorded T1, T2, T3, and T4 into the measurement information and send the measurement information to the positioning server, and the positioning server calculates the propagation duration t of the signal between the AP and the terminal. Where, T1 is time of sending the signal by the AP, T2 is time of receiving the signal by the terminal from the AP, T3 is time of sending the feedback signal from the terminal to the AP, T4 is time of receiving the feedback signal by the AP from the terminal, and T is a reception and sending processing delay. The reception and sending processing delay T may be obtained according to an empirical value, or measured when the network is deployed. For example, a feasible measurement method is: Let the AP be close to the AP, and send a test message at time T5; after receiving the message at time T6, the AP sends a feedback message at time T7 immediately; when receiving the feedback message at time T8, the terminal can calculate the reception and sending processing delay T=[(T8−T5)−(T7−T6)]/2. This embodiment does not limit the manner of obtaining the reception and sending processing delay T.

For another example, when a TDOA mode is selected for positioning, the signal propagation time information is a duration difference of propagating the signal between the terminal and any two APs. The duration difference of propagating the signal between the terminal and the two APs may be obtained according to a signal receiving time difference in the measurement information of the two APs. Exemplarily, the terminal sends a packet to all APs simultaneously. The packet carries a terminal identifier such as a MAC address of a network adapter or a physical address of an RFID tag. After receiving the signal, the AP records identifier information of the terminal, the RSSI of the signal detected by the terminal, and signal receiving time, and then generates measurement information and sends it to the positioning server. According to the signal receiving time difference in the measurement information measured and reported by the two APs, the positioning server obtains a duration difference of propagating the signal between the terminal and the two APs.

The calculating unit 502 is configured to select three APs to be measured in the set of APs to be measured according to a preset rule, and calculate a first coordinate of a terminal according to signal propagation time information of the three APs to be measured.

Preferably, the signal propagation time information is a propagation duration of the signal between the AP and the terminal, and the preset rule is to sort the propagation durations of the signal between the AP and the terminal in ascending order.

Alternatively, the signal propagation time information is a duration difference of propagating the signal between the terminal and any two APs, and the preset rule is to sort the time of receiving the signal by the AP in ascending order.

In this way, the AP to be measured that is closest to the terminal may be selected as possible, which minimizes the probability of reflection impact and reduces calculation workload.

Exemplarily, after receiving measurement information about the same terminal from all APs to be measured, the positioning server may use B to express the set of all APs to be measured.

Initially, the number of elements in the set B is greater than or equal to 3. At this time, any three APs to be measured may be selected in B. For example, a first AP, a second AP, and a third AP are selected. A first coordinate of the terminal is calculated according to the location service information of the three APs.

According to the signal propagation time information in the location service information, the positioning server selects the TOA method or the TDOA method to calculate the first coordinate of the terminal. However, the method for calculating the first coordinate of the terminal in the present invention is not limited to the TOA or TDOA. Any calculation methods that make use of the propagation time are appropriate if they can fulfill the objectives of the present invention.

The detailed computing process is the same as the method embodiment, and is not repeated herein any further.

The second obtaining unit 503 is configured to obtain a calculated RSSI value of any unmeasured AP in the three APs to be measured at the first coordinate according to a preset propagation model signal graph.

Exemplarily, the step of setting the propagation model signal graph may include:

setting a grid in which the side length of a grid cell meets a required positioning precision, where exemplarily, if the required positioning precision is 5 meters, the side length of the grid cell may be smaller than or equal to 5 meters;

importing a storey structure diagram that has the same scale as the grid into the grid, where the storey structure diagram includes obstacle information, and exemplarily, the obstacle information includes whereabouts of obstacles and types of obstacles, and the attenuation value of the obstacles is an empirical value, and can be read from a database on the positioning server or obtained by other means;

marking the location of each AP in the network; and calculating the RSSI value of each AP that is received by each grid cell in the grid.

It should be noted that, the calculating the RSSI value of each AP that is received by each grid cell is covered in the prior art, and is not limited herein. For example, the calculation may be performed by using the following formula:

$$P(d) = P(d_0) - 10n\log\left(\frac{d}{d_0}\right) - \begin{cases} nW * WAF & nW < C \\ C * WAF & nW \geq C \end{cases}$$

Where, d is a distance from a current location to an access point, $P(d)$ is an RSSI value of receiving in the current location, $P(d_0)$ is an RSSI value of receiving in a location at a distance of $d_0$ from the AP, n is an attenuation factor of the signal propagated in the air, WAF is attenuation of the signal penetrating an obstacle, nW is the number of obstacles penetrated in the propagation process, and C is an upper limit of the number of obstacles.

It should be noted that, the RSSI value of each AP that is received by each grid cell may be calculated and stored first, and then the RSSI value of the AP that is received at the first coordinate may be queried according to the first coordinate of the terminal; or the calculation may be performed instantly, which may be set according to a computing power and a storage capacity of the positioning server.

However, to implement more precise positioning, when any change occurs in the calculation method based on the propagation model, or occurs in the formula or a parameter of the formula, update and storage can be performed in time.

The first determining unit 504 is configured to determine whether the calculated RSSI value of the unmeasured AP is smaller than a difference between a measured RSSI value of the unmeasured AP and a preset threshold, so as to determine whether signals of the unmeasured AP are not affected by reflection.

Exemplarily, the positioning server may preset a time threshold $\Delta$, and it is deemed that reflection affects the positioning result only if the calculated RSSI value is smaller than the measured RSSI value by more than $\Delta$, where the value of $\Delta$ may be selected according to the required positioning precision.

The second determining unit 505 is configured to determine, according to the identifiers of the APs, whether all the three APs to be measured have been measured if the first determining unit determines that the calculated RSSI value of the unmeasured AP is not smaller than the difference between the measured RSSI value of the unmeasured AP and the preset threshold and that the signals of the unmeasured AP are not affected by reflection.

If the first determining unit 504 determines that the calculated RSSI value of the first AP at the first coordinate in the propagation model signal graph is greater than or equal to the measured RSSI value $-\Delta$ and that signal propagation between the first AP and the terminal is not affected by reflection, the second determining unit 505 determines, according to the identifier of the AP, whether all the three APs to be measured have been measured. If any AP in the three APs to be measured is still not measured, the second obtaining unit 503 reselects an unmeasured AP in the three APs to be measured and obtains a calculated RSSI value of the unmeasured AP, and the first determining unit 504 further determines whether the signals of the unmeasured AP are affected by reflection.

The positioning unit 506 is configured to determine the first coordinate as a location coordinate of the terminal if the second determining unit 505 determines that all the three APs to be measured have been measured, thereby positioning the terminal.

Exemplarily, if the first AP, the second AP, and the third AP have all been measured, it indicates that no signal reflection between the first AP and the terminal, or between the second AP and the terminal, or between the third AP and the terminal affects the positioning result. Therefore, the first coordinate obtained by using the first AP, the second AP, and the third AP is a location coordinate of the terminal, thereby positioning the terminal.

Figure 6:
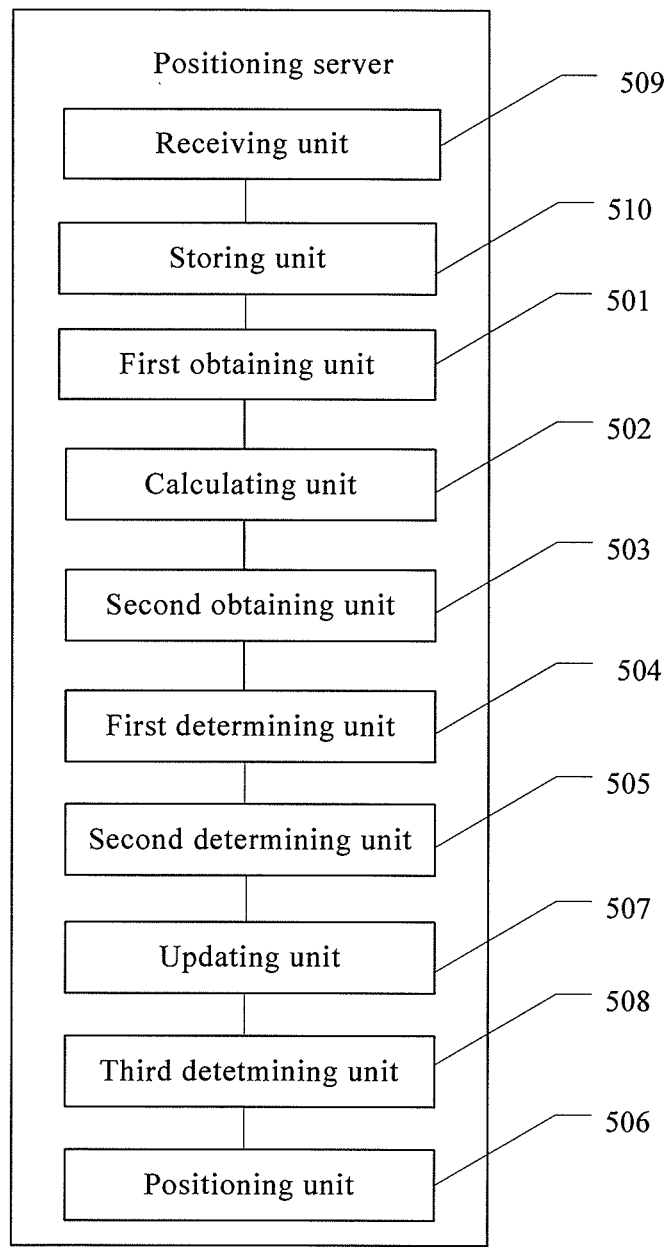
FIG. 6 is a structural diagram of another positioning device according to an embodiment of the present invention.

Further, referring to FIG. 6, the positioning server further includes an updating unit 507, a third determining unit 508, a receiving unit 509, and a storing unit 510. Here, The updating unit 507 is configured to delete the unmeasured AP from the set of APs to be measured to obtain an updated set of APs to be measured if the first determining unit 504 determines that the calculated RSSI value of the unmeasured AP is smaller than the difference between the measured RSSI value of the unmeasured AP and the preset threshold and that the signals of the unmeasured AP are affected by reflection.

Exemplarily, if the first determining unit 504 determines that the calculated RSSI value of the first AP is smaller than the difference between the measured RSSI value of the first AP and the preset threshold and that the signals between the first AP and the terminal are reflected, the updating unit 507 deletes the first AP from the set of APs to be measured to obtain an updated set of APs to be measured, that is, deletes the first AP from the set B to obtain an updated set B.

The third determining unit 508 is configured to determine whether the number of APs in the updated set of APs to be measured is smaller than 3.

Exemplarily, if the number of APs in the updated set of APs to be measured is greater than or equal to 3, the calculating unit 502 selects three APs to be measured in the updated set B, and recalculates the first coordinate of the terminal; the second obtaining unit 503 selects any unmeasured AP in the three APs to be measured, and obtains a calculated RSSI value of the unmeasured AP at the first coordinate according to a preset propagation model signal graph; the first determining unit 504 determines whether the calculated RSSI value of the unmeasured AP is smaller than the difference between the measured RSSI value of the unmeasured AP and a preset threshold, so as to determine whether the signals of the unmeasured AP are affected by reflection; if the first determining unit 504 determines that the signals of the unmeasured AP are affected by reflection, the updating unit 507 deletes the AP and updates the set B again; if the first determining unit 504 determines that the signals of the unmeasured AP are not affected by reflection, the second obtaining unit 503 and the first determining unit 504 go on determining whether the signals of other APs in the three APs to be measured are affected by reflection.

The positioning unit 506 is further configured to select three APs with the greatest measured RSSI value in the set of APs to be measured if the third determining unit 508 determines that the number of APs in the updated set of APs to be measured is smaller than 3;

calculate a second coordinate of the terminal according to signal propagation time information in location service information of the three APs with the greatest measured RSSI value;

obtain their respective calculated RSSI values of the three APs with the greatest measured RSSI value at all coordinates in the preset propagation model signal graph according to the preset propagation model signal graph, calculate and compare quadratic sums of differences between the calculated RSSI values of the three APs with the greatest measured RSSI value at all coordinates and the three corresponding measured RSSI values of the APs, and use a coordinate corresponding to a minimum quadratic sum as a third coordinate of the terminal; and use an intermediate coordinate of the second coordinate and the third coordinate as a location coordinate of the terminal, thereby positioning the terminal.

The receiving unit 509 is configured to receive measurement information sent by an AP in the set of APs to be measured, where the measurement information includes a measured received signal strength indicator RSSI value, and a propagation duration of a signal between the AP and a terminal, or time of receiving the signal by the AP.

The storing unit 510 is configured to store the preset propagation model signal graph and preset rules.

With the positioning device provided in the embodiment of the present invention and applied to indoor WLAN positioning, a comparison is made for the same AP to be measured to check whether a difference between a measured RSSI value in the location service information of the AP to be measured and a calculated RSSI value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

Figure 7:
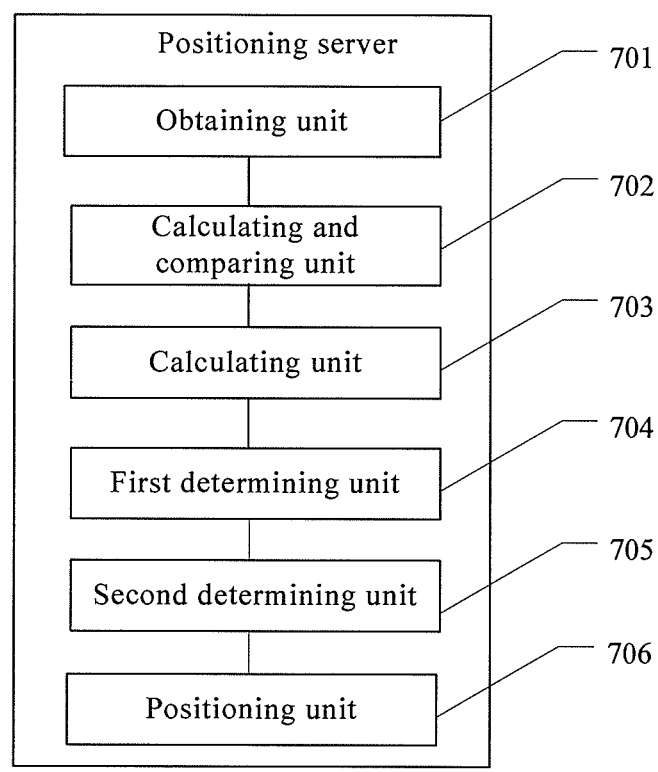
FIG. 7 is a structural diagram of another positioning device according to an embodiment of the present invention.

An embodiment of the present invention provides another positioning device to implement the method shown in FIG. 2. Referring to FIG. 7, the device includes an obtaining unit 701, a calculating and comparing unit 702, a calculating unit 703, a first determining unit 704, a second determining unit 705, and a positioning unit 706. Here, The obtaining unit 701 is configured to obtain location service information of APs in a set of APs to be measured, where the set of APs to be measured includes at least three APs, and the location service information includes an identifier of an AP, a measured received signal strength indicator RSSI value, and a measured signal propagation duration value.

The detailed process and manners are the same as those in the method embodiment, and are not repeated herein any further.

The calculating and comparing unit 702 is configured to obtain their respective calculated RSSI values of all APs in the set of APs to be measured at all coordinates in a preset propagation model signal graph according to the preset propagation model signal graph, calculate and compare quadratic sums of differences between the calculated RSSI values of all APs in the set of APs to be measured at all coordinates and the three corresponding measured RSSI values of the APs, and use the coordinate corresponding to a minimum quadratic sum as a first coordinate of the terminal.

Exemplarily, after receiving information about the same terminal from all APs, the positioning server may use B to express the set of all APs.

Initially, the number of elements in the set B is greater than or equal to 3.

The manner of setting the propagation model signal graph is the same as the foregoing embodiment, and is not repeated herein any further. Also, the RSSI value of each AP that is received by each grid cell may be calculated and stored first; or the calculation may be performed instantly, which may be set according to a computing power and a storage capacity of the positioning server. However, to implement more precise positioning, when any change occurs in the calculation method based on the propagation model, or occurs in the formula or a parameter of the formula, update and storage can be performed in time.

Exemplarily, it is assumed that the set of APs to be measured includes n APs. Therefore, the measured RSSI values of the n APs are A1, A2, A3, ..., An.

Their respective calculated RSSI values of the n APs at all coordinates in a preset propagation model signal graph are obtained according to the preset propagation model signal graph. For example, the calculated RSSI values of the n APs at coordinate A in the preset propagation model signal graph are a1, a2, a3, ..., An, respectively, and the calculated RSSI values at coordinate B are b1, b2, b3, ..., Bn, respectively. In this way, the calculated RSSI values of the n APs at all coordinates are obtained.

The quadratic sums of differences between the calculated RSSI values of the n APs at all coordinates and the corresponding measured RSSI values of the APs are calculated and compared. For example, at coordinate A, the quadratic sum of the differences between the measured values of the n APs and the calculated values is $(A1-a1)^2+(A2-a2)^2+(A3-a3)^2+ \ldots +(An-an)^2$; at coordinate B, the quadratic sum of the differences between the measured values of the n APs and the calculated values is $(A1-b1)^2+(A2-b2)^2+(A3-b3)^2+ \ldots +(An-bn)^2$. In this way, the quadratic sums of differences between the calculated RSSI values of the n APs at all coordinates and the corresponding measured RSSI values of the APs are obtained. The quadratic sums of differences between the calculated RSSI values of the n APs at all coordinates and the corresponding measured RSSI values of the APs are compared, and the coordinate corresponding to the minimum quadratic sum is a first coordinate of the terminal.

Preferably, to reduce the calculation workload, it is appropriate to determine the coordinate of the AP with the greatest measured RSSI value in the set of APs to be measured in the preset propagation model signal graph first, and then calculate a quadratic sum of differences between the calculated RSSI values of the n APs, which are located at coordinates corresponding to a cell of this coordinate and cells around this cell, and the corresponding measured RSSI values of the APs, and use the coordinate corresponding to a minimum quadratic sum as a first coordinate of the terminal.

In practice, signal reflection may occur. Therefore, the obtained first coordinate of the terminal may be not the actual location of the terminal.

The calculating unit 703 is configured to select, according to a preset rule, any unmeasured AP in the set of APs to be measured, and calculate a calculated signal propagation duration value of propagation from the unmeasured AP to the first coordinate in the propagation model signal graph according to a distance from the unmeasured AP to the first coordinate in the preset propagation model signal graph.

By using the coordinate of the first AP and the first coordinate of the terminal, a distance from the first AP to the first coordinate in the propagation model signal graph is obtained; and by dividing the light velocity by the distance, a calculated duration value of propagation from the first AP to the first coordinate in the propagation model signal graph is obtained.

The first determining unit 704 is configured to determine whether an absolute value of a difference between the calculated signal propagation duration value of the unmeasured AP and the measured signal propagation duration value of the unmeasured AP is greater than a preset threshold, so as to determine whether signals of the unmeasured AP are not affected by reflection.

Exemplarily, the positioning server may preset a threshold ΔT, whose value may be determined according to a required positioning precision. If the difference between the measured duration value of propagation from the terminal to the first AP and the propagation duration value calculated according to the propagation model signal graph is smaller than or equal to the preset threshold ΔT, it is deemed that the reflection between the first AP and the terminal imposes little or no impact on the positioning result.

The second determining unit 705 is configured to determine, according to the identifiers of the APs, whether all the APs in the set of APs to be measured have been measured if the first determining unit 704 determines that the absolute value of the difference between the calculated signal propagation duration value of the unmeasured AP and the measured signal propagation duration value of the unmeasured AP is not greater than the preset threshold and that the signals of the unmeasured AP are not affected by reflection.

Exemplarily, the second determining unit 705 determines, according to the identifiers of the APs, whether all the APs in the set of APs to be measured have been measured if the first determining unit 704 determines that the absolute value of the difference between the calculated signal propagation duration value of the unmeasured AP and the measured signal propagation duration value of the unmeasured AP is not greater than the preset threshold and that the signals of the unmeasured AP are not affected by reflection. If the second determining unit 705 determines that any unmeasured AP still exists in the set of APs to be measured, the calculating unit 703 selects any unmeasured AP in the set of APs to be measured, and calculates a calculated signal propagation duration value of the unmeasured AP, and the first determining unit 704 goes on determining whether the signals of the unmeasured AP are affected by reflection, and so on.

The positioning unit 706 is configured to determine the first coordinate as a location coordinate of the terminal if the second determining unit 705 determines that all the APs in the set of APs to be measured have been measured, thereby positioning the terminal.

Exemplarily, if all APs in the set of APs to be measured have been measured, it indicates that the signal of no AP in the set of APs to be measured is affected by reflection. Therefore, the first coordinate of the terminal that is obtained by using the AP in the set of APs to be measured is a location coordinate of the terminal, thereby positioning the terminal.

Figure 8:
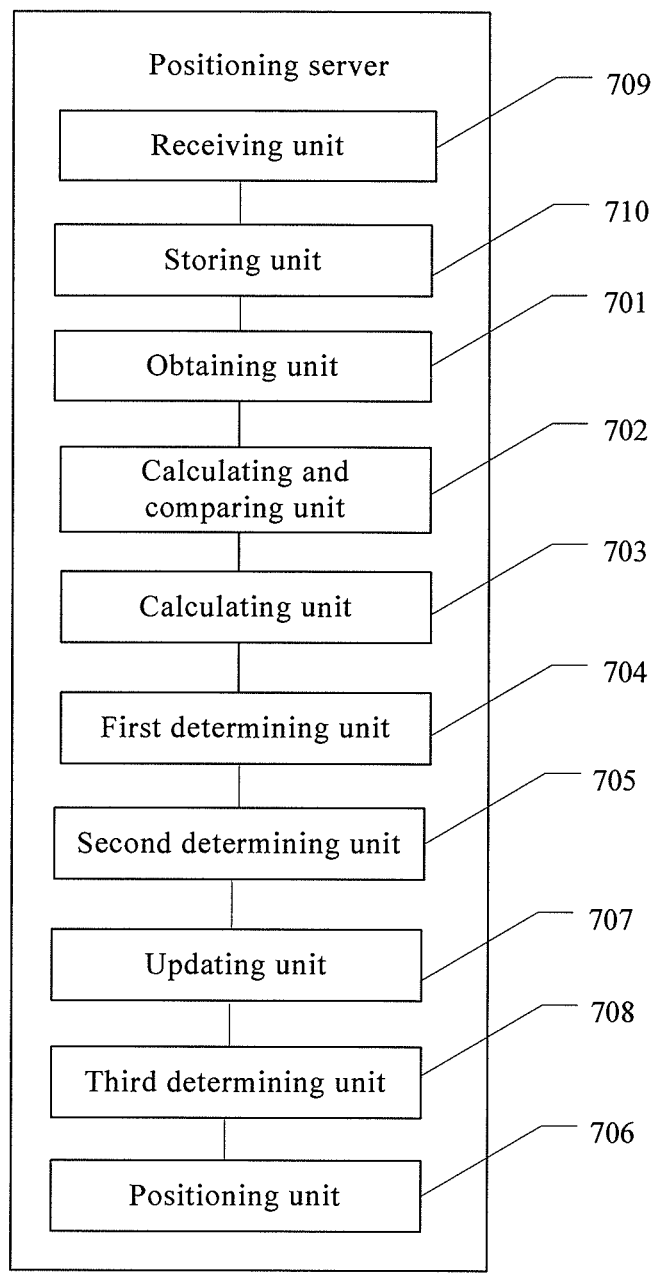
FIG. 8 is a structural diagram of another positioning device according to an embodiment of the present invention.

Further, referring to FIG. 8, the positioning device further includes an updating unit 707, a third determining unit 708, a receiving unit 709, and a storing unit 710, as described below.

The updating unit 707 is configured to delete the unmeasured AP from the set of APs to be measured to obtain an updated set of APs to be measured if the first determining unit 704 determines that the absolute value of the difference between the calculated signal propagation duration value of the unmeasured AP and the measured signal propagation duration value of the unmeasured AP is greater than the preset threshold and that the signals of the unmeasured AP are affected by reflection.

The third determining unit 708 is configured to determine whether the number of APs in the updated set of APs to be measured is smaller than 3.

Exemplarily, after the updating unit 707 deletes the measured AP whose signals are affected by reflection to obtain an updated set of APs to be measured, if the third determining unit 708 determines that the number of APs in the updated set of APs to be measured is greater than or equal to 3, the calculating and comparing unit 702 uses the positioning service information of all APs in the updated set of APs to be measured to obtain a new first coordinate of the terminal. The calculating unit 703 selects, according to a preset rule, any unmeasured AP in the updated set of APs to be measured, and calculates a calculated propagation duration value of the unmeasured AP according to a distance from the unmeasured AP to the new first coordinate in the preset propagation model signal graph. The first determining unit 704 determines whether the signals of the unmeasured AP are affected by reflection, and if the unmeasured AP is affected by reflection, the updating unit 707 deletes the unmeasured AP and obtains an updated set of APs to be measured again, or, if the unmeasured AP is not affected by reflection, a further determination is made as to whether other APs are affected by reflection.

The positioning unit 706 is further configured to select three APs in the set of APs to be measured if the third determining unit 708 determines that the number of APs in the updated set of APs to be measured is smaller than 3, where the selected APs are those with smallest differences between the calculated signal propagation duration value and the measured signal propagation duration value in the set of APs to be measured;

calculate a second coordinate of the terminal according to the measured signal propagation duration value in the location service information of the three APs;

obtain their respective calculated RSSI values of the three APs at all coordinates in a preset propagation model signal graph according to the preset propagation model signal graph, calculate and compare quadratic sums of differences between the calculated RSSI values of the three APs at all coordinates and the three corresponding measured RSSI values of the APs, and use a coordinate corresponding to a minimum quadratic sum as a third coordinate of the terminal; and use an intermediate coordinate of the second coordinate and the third coordinate as a location coordinate of the terminal, thereby positioning the terminal.

The receiving unit 709 is configured to receive measurement information sent by an AP in the set of APs to be measured, where the measurement information includes a measured received signal strength indicator RSSI value and a propagation duration of a signal between the AP and the terminal.

The storing unit 710 is configured to store the preset propagation model signal graph.

With the positioning device provided in the embodiment of the present invention and applied to indoor WLAN positioning, a comparison is made first for the same AP to be measured to check whether a difference between a measured propagation duration value in the location service information of the AP to be measured and a calculated propagation duration value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

Figure 9:
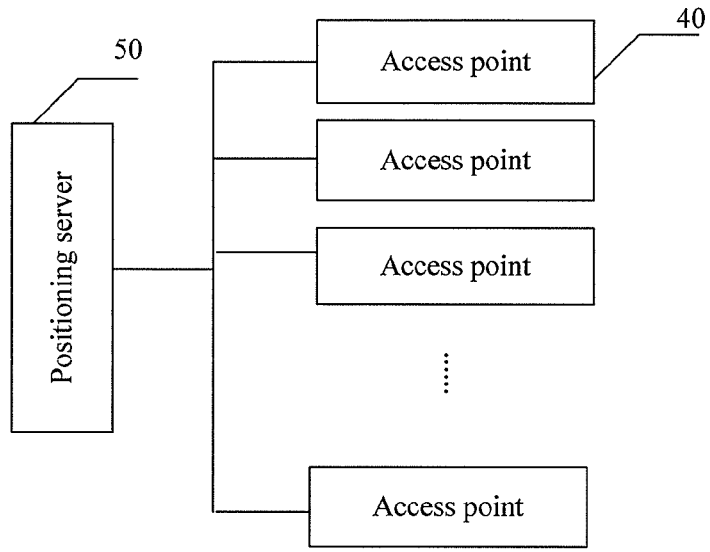
FIG. 9 is a system diagram of a positioning system according to an embodiment of the present invention.

In another aspect, an embodiment of the present invention provides a positioning system. Referring to FIG. 9, the system includes at least three APs 40 and a positioning server 50. Here, The positioning server 50 is configured to obtain location service information of APs in a set of APs to be measured, where the set of APs to be measured includes at least three APs, and the location service information includes an identifier of an AP, a measured received signal strength indicator RSSI value, and signal propagation time information; select three APs to be measured in the set of APs to be measured according to a preset rule, and calculate a first coordinate of a terminal according to signal propagation time information of the three APs to be measured; obtain a calculated RSSI value of any unmeasured AP in the three APs to be measured at the first coordinate according to a preset propagation model signal graph; determine that signals of the unmeasured AP are not affected by reflection if the calculated RSSI value of the unmeasured AP is not smaller than a difference between a measured RSSI value of the unmeasured AP and a preset threshold, and determine, according to the identifiers of the APs, whether all the three APs to be measured have been measured; and use the first coordinate as a location coordinate of the terminal if all the three APs to be measured have been measured, thereby positioning the terminal.

The at least three APs 40 are configured to send measurement information to the positioning server.

Figure 10:
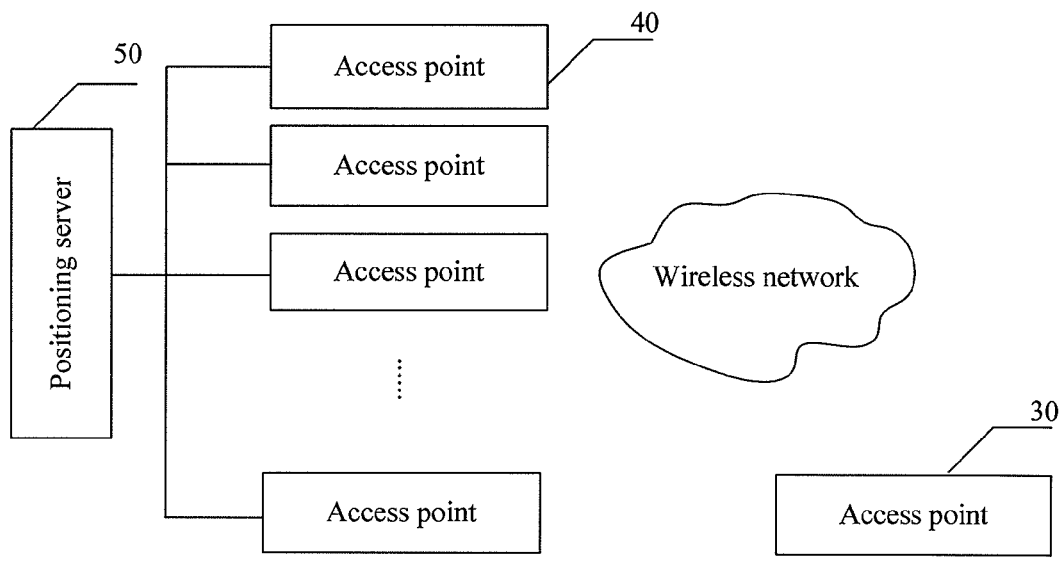
FIG. 10 is a system diagram of another positioning system according to an embodiment of the present invention.

Optionally, referring to FIG. 10, the system further includes a terminal 30.

Exemplarily, a signal is propagated between the AP 40 and the terminal 30, and therefore, the AP 40 obtains the measurement information, and sends the measurement information to the positioning server 50, and the positioning server 50 obtains positioning service information according to the measurement information, and uses the positioning service information to locate the terminal 30.

With the positioning system provided in the embodiment of the present invention and applied to indoor WLAN positioning, a comparison is made for the same AP to be measured to check whether a difference between a measured RSSI value in the location service information of the AP to be measured and a calculated RSSI value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

An embodiment of the present invention provides another positioning system. Referring to FIG. 9, the system includes at least three APs 40 and a positioning server 50. Here, The positioning server 50 is configured to obtain location service information of APs in a set of APs to be measured, where the set of APs to be measured includes at least three APs, and the location service information includes an identifier of an AP, a measured received signal strength indicator RSSI value, and a measured signal propagation duration value; obtain their respective calculated RSSI values of all APs in the set of APs to be measured at all coordinates in a preset propagation model signal graph according to the preset propagation model signal graph, calculate and compare quadratic sums of differences between the calculated RSSI values of all APs in the set of APs to be measured at all coordinates and the three corresponding measured RSSI values of the APs, and use the coordinate corresponding to a minimum quadratic sum as a first coordinate of the terminal; select, according to a preset rule, any unmeasured AP in the set of APs to be measured, and calculate a calculated signal propagation duration value of propagating a signal from the unmeasured AP to the first coordinate in the propagation model signal graph according to a distance from the unmeasured AP to the first coordinate in the preset propagation model signal graph; determine that signals of the unmeasured AP are not affected by reflection if an absolute value of a difference between the calculated signal propagation duration value of the unmeasured AP and the measured signal propagation duration value of the unmeasured AP is not greater than a preset threshold, and determine, according to the identifiers of the APs, whether all APs in the set of APs to be measured have been measured; and use the first coordinate as a location coordinate of the terminal if all APs in the set of APs to be measured have been measured, thereby positioning the terminal.

The at least three APs 40 are configured to send measurement information to the positioning server. Optionally, referring to FIG. 10, the system further includes a terminal 30.

Exemplarily, a signal is propagated between the AP 40 and the terminal 30, and therefore, the AP 40 obtains the measurement information, and sends the measurement information to the positioning server 50, and the positioning server 50 obtains positioning service information according to the measurement information, and uses the positioning service information to locate the terminal 30.

With the positioning system provided in the embodiment of the present invention and applied to indoor WLAN positioning, a comparison is made first for the same AP to be measured to check whether a difference between a measured propagation duration value in the location service information of the AP to be measured and a calculated propagation duration value obtained according to a preset propagation model signal graph falls within a preset threshold according to location service information and a preset propagation model signal graph; a determination is made as to whether signal propagation between the AP to be measured and a terminal affects precision of positioning results, and then location coordinates of the terminal are obtained by using the APs whose signal is not affected by reflection, thereby improving precision of the terminal location.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A positioning method, comprising:
    101. obtaining, by a positioning server, location service information of APs in a set of APs to be measured, wherein the set of APs to be measured comprises at least three APs, and the location service information comprises an identifier of an AP, a measured received signal strength indicator RSSI value, and signal propagation time information;
    102. selecting, by the positioning server, three APs to be measured in the set of APs to be measured according to a preset rule, and calculating a first coordinate of a terminal according to signal propagation time information of the three APs to be measured;
    103. obtaining, by the positioning server, a calculated RSSI value of any unmeasured AP in the three APs to be measured at the first coordinate according to a preset propagation model signal graph;
    104. determining that signals of the unmeasured AP are not affected by reflection if the calculated RSSI value of the unmeasured AP is not smaller than a difference between a measured RSSI value of the unmeasured AP and a preset threshold, and determining, by the positioning server according to the identifiers of the APs, whether all the three APs to be measured have been measured;
    105. performing 103 and 104 repeatedly if any one of the three APs to be measured has still not been measured; and
    106. using the first coordinate as a location coordinate of the terminal if all the three APs to be measured have been measured, thereby positioning the terminal.

2. The positioning method according to claim 1, further comprising:
    determining that the signals of the unmeasured AP are affected by reflection if the calculated RSSI value of the unmeasured AP is smaller than the difference between the measured RSSI value of the unmeasured AP and the preset threshold, and deleting, by the positioning server, the unmeasured AP from the set of APs to be measured to obtain an updated set of APs to be measured; and
    performing 102 to 104 repeatedly if the number of APs in the updated set of APs to be measured is greater than or equal to 3.

3. The positioning method according to claim 2, further comprising:
    selecting, by the positioning server, three APs with the greatest measured RSSI value in the set of APs to be measured when the number of APs in the updated set of APs to be measured is smaller than 3;

calculating a second coordinate of the terminal according to signal propagation time information of the three APs with the greatest measured RSSI value;

obtaining their respective calculated RSSI values of the three APs with the greatest measured RSSI value at all coordinates in the propagation model signal graph according to the preset propagation model signal graph, calculating and comparing quadratic sums of differences between the calculated RSSI values of the three APs with the greatest measured RSSI value at all coordinates and the three corresponding measured RSSI values of the APs, and using a coordinate corresponding to a minimum quadratic sum as a third coordinate of the terminal; and using an intermediate coordinate of the second coordinate and the third coordinate as a location coordinate of the terminal, thereby positioning the terminal.

4. The positioning method according to claim 3, wherein:

the signal propagation time information is a propagation duration of the signal between the AP and the terminal, and the preset rule is to sort the propagation durations of the signal between the AP and the terminal in ascending order; or the signal propagation time information is a duration difference of propagating the signal between the terminal and any two APs, and the preset rule is to sort the time of receiving the signal by the AP in ascending order.

5. The positioning method according to claim 4, wherein:

before 101, the method further comprises: receiving, by the positioning server, measurement information sent by the APs in the set of APs to be measured;

correspondingly, 101 specifically comprises: obtaining, by the positioning server according to the measurement information, location service information of the APs in the set of APs to be measured, wherein the measurement information comprises a measured RSSI value, and a propagation duration of a signal between the AP and the terminal, or time of receiving the signal by the AP.

6. The positioning method according to claim 2, wherein:

the signal propagation time information is a propagation duration of the signal between the AP and the terminal, and the preset rule is to sort the propagation durations of the signal between the AP and the terminal in ascending order; or the signal propagation time information is a duration difference of propagating the signal between the terminal and any two APs, and the preset rule is to sort the time of receiving the signal by the AP in ascending order.

7. The positioning method according to claim 1, wherein:

before 101, the method further comprises: receiving, by the positioning server, measurement information sent by the APs in the set of APs to be measured;

correspondingly, 101 specifically comprises: obtaining, by the positioning server according to the measurement information, location service information of the APs in the set of APs to be measured, wherein the measurement information comprises a measured RSSI value, and a propagation duration of a signal between the AP and the terminal, or time of receiving the signal by the AP.

8. A positioning method, comprising:

101. obtaining, by a positioning server, location service information of APs in a set of APs to be measured, wherein the set of APs to be measured comprises at least three APs, and the location service information comprises an identifier of an AP, a measured received signal strength indicator RSSI value, and a measured signal propagation duration value;

102. obtaining, by the positioning server, their respective calculated RSSI values of all APs in the set of APs to be measured at all coordinates in a preset propagation model signal graph according to the preset propagation model signal graph, calculating and comparing quadratic sums of differences between the calculated RSSI values of all APs in the set of APs to be measured at all coordinates and the three corresponding measured RSSI values of the APs, and using the coordinate corresponding to a minimum quadratic sum as a first coordinate of the terminal;

103. selecting, by the positioning server according to a preset rule, any unmeasured AP in the set of APs to be measured, and calculating a calculated signal propagation duration value of propagation from the unmeasured AP to the first coordinate in the propagation model signal graph according to a distance from the unmeasured AP to the first coordinate in the preset propagation model signal graph;

104. determining that signals of the unmeasured AP are not affected by reflection if an absolute value of a difference between a calculated signal propagation duration value of the unmeasured AP and the measured signal propagation duration value of the unmeasured AP is not greater than a preset threshold, and determining, by the positioning server according to the identifiers of the APs, whether all APs in the set of APs to be measured have been measured;

105. performing 103 and 104 repeatedly if any AP in the set of APs to be measured has still not been measured; and 106. using the first coordinate as a location coordinate of the terminal if all APs in the set of APs to be measured have been measured, thereby positioning the terminal.

9. The positioning method according to claim 8, further comprising:

determining that the signals of the unmeasured AP are affected by reflection if the absolute value of the difference between the calculated signal propagation duration value of the unmeasured AP and the measured signal propagation duration value of the unmeasured AP is greater than the preset threshold, and deleting, by the positioning server, the unmeasured AP from the set of APs to be measured to obtain an updated set of APs to be measured; and performing 102 to 104 repeatedly if the number of APs in the updated set of APs to be measured is greater than or equal to 3.

10. The positioning method according to claim 9, further comprising:

selecting three APs in the set of APs to be measured when the number of APs in the updated set of APs to be measured is smaller than 3, wherein the selected three APs are those with the smallest difference between the calculated signal propagation duration value and the measured signal propagation duration value in the set of APs to be measured;

calculating a second coordinate of the terminal according to the measured signal propagation duration value in the location service information of the three APs;

obtaining their respective calculated RSSI values of the three APs at all coordinates in a preset propagation model signal graph according to the preset propagation model signal graph, calculating and comparing quadratic sums of differences between the calculated RSSI values of the three APs at all coordinates and the three corresponding measured RSSI values of the APs, and using a coordinate corresponding to a minimum quadratic sum as a third coordinate of the terminal; and using an intermediate coordinate of the second coordinate and the third coordinate as a location coordinate of the terminal, thereby positioning the terminal.

11. The positioning method according to claim 10, wherein:

before 101, the method further comprises: receiving, by the positioning server, measurement information sent by the APs in the set of APs to be measured;

correspondingly, 101 specifically comprises: obtaining, by the positioning server according to the measurement information, location service information of the APs in the set of APs to be measured, wherein the measurement information comprises a measured RSSI value, and a propagation duration of a signal between the AP and a terminal.

12. A positioning device, comprising:

a first obtaining unit, configured to obtain location service information of APs in a set of APs to be measured, wherein the set of APs to be measured comprises at least three APs, and the location service information comprises an identifier of an AP, a measured received signal strength indicator RSSI value, and signal propagation time information;

a calculating unit, configured to select three APs to be measured in the set of APs to be measured according to a preset rule, and calculate a first coordinate of a terminal according to signal propagation time information of the three APs to be measured;

a second obtaining unit, configured to obtain a calculated RSSI value of any unmeasured AP in the three APs to be measured at the first coordinate according to a preset propagation model signal graph;

a first determining unit, configured to determine whether the calculated RSSI value of the unmeasured AP is smaller than a difference between a measured RSSI value of the unmeasured AP and a preset threshold, so as to determine whether signals of the unmeasured AP are not affected by reflection;

a second determining unit, configured to determine, according to the identifiers of the APs, whether all the three APs to be measured have been measured if the first determining unit determines that the calculated RSSI value of the unmeasured AP is not smaller than the difference between the measured RSSI value of the unmeasured AP and the preset threshold and that the signals of the unmeasured AP are not affected by reflection; and a positioning unit, configured to determine the first coordinate as a location coordinate of the terminal if the second determining unit determines that all the three APs to be measured have been measured, thereby positioning the terminal.

13. The positioning device according to claim 12, further comprising:

an updating unit is configured to delete the unmeasured AP from the set of APs to be measured to obtain an updated set of APs to be measured if the first determining unit determines that the calculated RSSI value of the unmeasured AP is smaller than the difference between the measured RSSI value of the unmeasured AP and the preset threshold and that the signals of the unmeasured AP are affected by reflection; and a third determining unit, configured to determine whether the number of APs in the updated set of APs to be measured is smaller than 3.

14. The positioning device according to claim 13, wherein:

the positioning unit is further configured to: select three APs with the greatest measured RSSI value in the set of APs to be measured if the third determining unit determines that the number of APs in the updated set of APs to be measured is smaller than 3; calculate a second coordinate of the terminal according to signal propagation time information in location service information of the three APs with the greatest measured RSSI value; obtain their respective calculated RSSI values of the three APs with the greatest measured RSSI value at all coordinates in the preset propagation model signal graph according to the preset propagation model signal graph, calculate and compare quadratic sums of differences between the calculated RSSI values of the three APs with the greatest measured RSSI value at all coordinates and the three corresponding measured RSSI values of the APs, and use a coordinate corresponding to a minimum quadratic sum as a third coordinate of the terminal; and use an intermediate coordinate of the second coordinate and the third coordinate as a location coordinate of the terminal, thereby positioning the terminal.

15. The positioning device according to claim 14, further comprising:

a receiving unit, configured to receive measurement information sent by an AP in the set of APs to be measured, wherein the measurement information comprises a measured RSSI value, and a propagation duration of a signal between the AP and a terminal, or time of receiving the signal by the AP.

16. A positioning device, comprising:

an obtaining unit, configured to obtain location service information of APs in a set of APs to be measured, wherein the set of APs to be measured comprises at least three APs, and the location service information comprises an identifier of an AP, a measured received signal strength indicator RSSI value, and a measured signal propagation duration value;

a calculating and comparing unit, configured to obtain their respective calculated RSSI values of all APs in the set of APs to be measured at all coordinates in a preset propagation model signal graph according to the preset propagation model signal graph, calculate and compare quadratic sums of differences between the calculated RSSI values of all APs in the set of APs to be measured at all coordinates and the three corresponding measured RSSI values of the APs, and use the coordinate corresponding to a minimum quadratic sum as a first coordinate of the terminal;

a calculating unit, configured to select, according to a preset rule, any unmeasured AP in the set of APs to be measured, and calculate a calculated signal propagation duration value of propagating a signal from the unmeasured AP to the first coordinate in the propagation model signal graph according to a distance from the unmeasured AP to the first coordinate in the preset propagation model signal graph;

a first determining unit, configured to determine whether an absolute value of a difference between the calculated signal propagation duration value of the unmeasured AP and the measured signal propagation duration value of the unmeasured AP is greater than a preset threshold, so as to determine whether signals of the unmeasured AP are not affected by reflection;

a second determining unit, configured to determine, according to the identifiers of the APs, whether all the APs in the set of APs to be measured have been measured if the first determining unit determines that the absolute value of the difference between the calculated signal propagation duration value of the unmeasured AP and the measured signal propagation duration value of the unmeasured AP is not greater than the preset threshold and that the signals of the unmeasured AP are not affected by reflection; and a positioning unit, configured to determine the first coordinate as a location coordinate of the terminal if the second determining unit determines that all the APs in the set of APs to be measured have been measured, thereby positioning the terminal.

17. The positioning device according to claim 16, further comprising:

an updating unit is configured to delete the unmeasured AP from the set of APs to be measured to obtain an updated set of APs to be measured if the first determining unit determines that the absolute value of the difference between the calculated signal propagation duration value of the unmeasured AP and the measured signal propagation duration value of the unmeasured AP is greater than the preset threshold and that the signals of the unmeasured AP are affected by reflection; and a third determining unit, configured to determine whether the number of APs in the updated set of APs to be measured is smaller than 3.

18. The positioning device according to claim 17, wherein:

The positioning unit is further configured to: select three APs in the set of APs to be measured when the third determining unit determines that the number of APs in the updated set of APs to be measured is smaller than 3, wherein the selected three APs are those with the smallest difference between the calculated signal propagation duration value and the measured signal propagation duration value in the set of APs to be measured; calculate a second coordinate of the terminal according to the measured signal propagation duration value in the location service information of the three APs; obtain their respective calculated RSSI values of the three APs at all coordinates in a preset propagation model signal graph according to the preset propagation model signal graph, calculate and compare quadratic sums of differences between the calculated RSSI values of the three APs and the three corresponding measured RSSI values of the APs, and use a coordinate corresponding to a minimum quadratic sum as a third coordinate of the terminal; and use an intermediate coordinate of the second coordinate and the third coordinate as a location coordinate of the terminal, thereby positioning the terminal.

19. The positioning device according to claim 18, wherein:

the device further comprises a receiving unit, configured to receive measurement information sent by an AP in the set of APs to be measured, wherein the measurement information comprises a measured received signal strength indicator RSSI value and a propagation duration of a signal between the AP and a terminal.

20. A positioning system, comprising at least three APs and a positioning device, wherein the positioning device is configured to obtain location service information of APs in a set of APs to be measured, wherein the set of APs to be measured comprises at least three APs, and the location service information comprises an identifier of an AP, a measured received signal strength indicator RSSI value, and signal propagation time information; select three APs to be measured in the set of APs to be measured according to a preset rule, and calculate a first coordinate of a terminal according to signal propagation time information of the three APs to be measured; obtain a calculated RSSI value of any unmeasured AP in the three APs to be measured at the first coordinate according to a preset propagation model signal graph; determine whether the calculated RSSI value of the unmeasured AP is smaller than a difference between a measured RSSI value of the unmeasured AP and a preset threshold, so as to determine whether signals of the unmeasured AP are not affected by reflection; determine, according to the identifiers of the APs, whether all the three APs to be measured have been measured if the first determining unit determines that the calculated RSSI value of the unmeasured AP is not smaller than the difference between the measured RSSI value of the unmeasured AP and the preset threshold and that the signals of the unmeasured AP are not affected by reflection; and determine the first coordinate as a location coordinate of the terminal if the second determining unit determines that all the three APs to be measured have been measured, thereby positioning the terminal; or the positioning device is configured to obtain location service information of APs in a set of APs to be measured, wherein the set of APs to be measured comprises at least three APs, and the location service information comprises an identifier of an AP, a measured received signal strength indicator RSSI value, and a measured signal propagation duration value; obtain their respective calculated RSSI values of all APs in the set of APs to be measured at all coordinates in a preset propagation model signal graph according to the preset propagation model signal graph, calculate and compare quadratic sums of differences between the calculated RSSI values of all APs in the set of APs to be measured at all coordinates and the three corresponding measured RSSI values of the APs, and use the coordinate corresponding to a minimum quadratic sum as a first coordinate of the terminal; select, according to a preset rule, any unmeasured AP in the set of APs to be measured, and calculate a calculated signal propagation duration value of propagating a signal from the unmeasured AP to the first coordinate in the propagation model signal graph according to a distance from the unmeasured AP to the first coordinate in the preset propagation model signal graph; determine whether an absolute value of a difference between the calculated signal propagation duration value of the unmeasured AP and the measured signal propagation duration value of the unmeasured AP is greater than a preset threshold, so as to determine whether signals of the unmeasured AP are not affected by reflection; determine, according to the identifiers of the APs, whether all the APs in the set of APs to be measured have been measured if the first determining unit determines that the absolute value of the difference between the calculated signal propagation duration value of the unmeasured AP and the measured signal propagation duration value of the unmeasured AP is not greater than the preset threshold and that the signals of the unmeasured AP are not affected by reflection; and determine the first coordinate as a location coordinate of the terminal if the second determining unit determines that all the APs in the set of APs to be measured have been measured, thereby positioning the terminal.

* * * * *